US010555611B2

(12) United States Patent
Mullen et al.

(10) Patent No.: US 10,555,611 B2
(45) Date of Patent: Feb. 11, 2020

(54) ADJUSTABLE SEATING SYSTEMS AND ASSOCIATED STRUCTURES

(71) Applicant: FORCE 3 INNOVATIONS INC., Moncton (CA)

(72) Inventors: Darrell J. Mullen, Dieppe (CA); Shawn Leger, Moncton (CA); Bruno Lagace, Dieppe (CA)

(73) Assignee: FORCE 3 INNOVATIONS INC., Moncton (CA)

( * ) Notice: Subject to any disclaimer, the term of this patent is extended or adjusted under 35 U.S.C. 154(b) by 617 days.

(21) Appl. No.: 15/101,654

(22) PCT Filed: Dec. 5, 2014

(86) PCT No.: PCT/CA2014/000867
§ 371 (c)(1),
(2) Date: Jun. 3, 2016

(87) PCT Pub. No.: WO2015/081419
PCT Pub. Date: Jun. 11, 2015

(65) Prior Publication Data
US 2016/0302577 A1 Oct. 20, 2016

Related U.S. Application Data

(60) Provisional application No. 61/912,707, filed on Dec. 6, 2013.

(51) Int. Cl.
*A47C 7/14* (2006.01)
*A47C 7/02* (2006.01)
*A47C 7/46* (2006.01)
*B60N 2/62* (2006.01)
*B60N 2/64* (2006.01)
*B60N 2/02* (2006.01)
(Continued)

(52) U.S. Cl.
CPC ............... *A47C 7/14* (2013.01); *A47C 1/032* (2013.01); *A47C 7/029* (2018.08); *A47C 7/16* (2013.01);
(Continued)

(58) Field of Classification Search
CPC .......... A47C 7/14; A47C 7/029; A47C 1/032; A47C 7/16; A47C 7/40; A47C 7/46;
(Continued)

(56) References Cited

U.S. PATENT DOCUMENTS 3,376,070 A 4/1968 Johnson
3,503,649 A 3/1970 Johnson
(Continued)

FOREIGN PATENT DOCUMENTS

CA 2663687 A1 5/1999
CA 2514298 A1 8/2003
(Continued)

OTHER PUBLICATIONS

PCT international Search Report and Written Opinion dated Mar. 11, 2015 re: International Application No. PCT/CA2014/000867.

*Primary Examiner* — Anthony D Barfield
(74) *Attorney, Agent, or Firm* — Norton Rose Fulbright Canada LLP

(57) ABSTRACT

Structures of seating systems for human users are disclosed. In one embodiment, the structure comprises: a frame; a seat structure supported by the frame; and a back rest structure supported by the frame. The seat structure comprises a thigh support region and a pelvic support region where the pelvic support region defines a pelvic well for receiving an ischial tuberosity of the user and also provides a fulcrum to assist in rotating the pelvis of the user. The back rest structure comprises a gluteal panel for supporting a gluteal mass of the user and a posterior superior iliac spine (PSIS) panel disposed above the gluteal panel. The PSIS panel is adjustable to cause movement of a PSIS of the user and cooperate with the pelvic well to cause rotation of the pelvis of the user about the fulcrum provided by the pelvic well.

33 Claims, 17 Drawing Sheets

(51) Int. Cl.
  *A47C 1/032* (2006.01)
  *A47C 7/16* (2006.01)
  *A47C 7/40* (2006.01)
  *B60N 2/66* (2006.01)
  *B60N 2/16* (2006.01)

(52) U.S. Cl.
  CPC ............... *A47C 7/40* (2013.01); *A47C 7/46* (2013.01); *B60N 2/0284* (2013.01); *B60N 2/162* (2013.01); *B60N 2/1675* (2013.01); *B60N 2/62* (2013.01); *B60N 2/643* (2013.01); *B60N 2/66* (2013.01)

(58) Field of Classification Search
  CPC ........ B60N 2/02; B60N 2/0284; B60N 2/162; B60N 2/1675; B60N 2/62; B60N 2/643; B60N 2/66
  USPC ...................................................... 297/483
  See application file for complete search history.

(56) References Cited

U.S. PATENT DOCUMENTS

| | | |
|---|---|---|
| 3,511,537 A | 5/1970 | Ackermann |
| 3,749,442 A | 7/1973 | Berg et al. |
| 4,960,304 A | 10/1990 | Frantz |
| 5,022,385 A | 6/1991 | Harza |
| 5,352,023 A | 10/1994 | Jay et al. |
| 5,378,045 A | 1/1995 | Siekman et al. |
| 5,857,749 A | 1/1999 | DeBellis et al. |
| 5,902,011 A | 5/1999 | Hand et al. |
| 5,934,749 A | 8/1999 | Pond et al. |
| 6,139,095 A | 10/2000 | Robertshaw |
| 6,175,980 B1 | 1/2001 | Gaither |
| 6,257,664 B1 | 7/2001 | Chew et al. |
| 7,140,057 B2 | 11/2006 | Hetzel et al. |
| 7,373,678 B2 | 5/2008 | Hetzel et al. |
| 7,387,339 B2 | 6/2008 | Bykov et al. |
| 7,896,436 B2 | 3/2011 | Kurrasch et al. |
| 7,967,379 B2 * | 6/2011 | Walters ............ A47C 1/023 297/284.3 X |
| 8,398,170 B2 * | 3/2013 | Walker ............ A47C 7/40 297/284.3 X |
| 2011/0101748 A1 | 5/2011 | Goetz |
| 2012/0223560 A1 | 9/2012 | Hetzel et al. |

FOREIGN PATENT DOCUMENTS

| | | |
|---|---|---|
| CA | 2475638 C | 1/2005 |
| CA | 2750303 A1 | 7/2010 |

* cited by examiner

ADJUSTABLE SEATING SYSTEMS AND ASSOCIATED STRUCTURES

CROSS REFERENCE TO RELATED APPLICATION AND CLAIM OF PRIORITY

This application is a national phase application under 35 U.S.C. 371 of International Patent Application No. PCT/CA2014/000867 filed on Dec. 5, 2014, which claims priority from U.S. provisional patent application No. 61/912,707 filed on Dec. 6, 2013, the entire contents of which are incorporated herein by reference.

TECHNICAL FIELD

The disclosure relates generally to seating systems, and more particularly to structures for such seating systems.

BACKGROUND OF THE ART

Humans have been only spending significant amounts of time sitting for about the last 150 years. Prior to this, we have spent most of our time weight bearing through our legs and feet. We have yet to see an evolutionary change that has adapted the human anatomy for spending a significant amount of time in a seated position.

Adjustable seating systems have been used in many applications and industries. For example, office chairs and vehicle seats often have mechanical adjustment capabilities that are intended to accommodate different body types and sizes. However, back pain and fatigue are still common symptoms among those sitting for relatively long periods of time such as office workers, vehicle drivers and equipment operators.

Improvement is therefore desirable.

SUMMARY

In one aspect, the disclosure describes a structure of a seating system for a human user. The structure comprises:
 a frame;
 a seat structure supported by the frame, the seat structure comprising a thigh support region and a pelvic support region, the pelvic support region defining a pelvic well for receiving an ischial tuberosity of the user and providing a fulcrum for rotation of a pelvis of the user;
 a back rest structure supported by the frame, the back rest structure comprising:
  a gluteal panel for supporting a gluteal mass of the user; and
  a posterior superior iliac spine (PSIS) panel disposed above the gluteal panel, the PSIS panel being adjustable to cause movement of a PSIS of the user and cooperate with the pelvic well to cause rotation of the pelvis of the user about the fulcrum provided by the pelvic well.

The PSIS panel may be adjustable by translation.

The PSIS panel may be adjustable by rotation.

The PSIS panel may comprise two loading zones separated by a spine relief zone. The two loading zones of the PSIS panel may be adjacent the spine relief zone of the PSIS panel. The spine relief zone of the PSIS panel may comprise a recess formed into the PSIS panel.

The PSIS panel may have an overall concave shape facing the user.

The gluteal panel may be adjustable by translation.

The gluteal panel may be adjustable by rotation.

The gluteal panel may comprise two loading zones separated by a spine relief zone. The two loading zones of the gluteal panel may be adjacent the spine relief zone of the gluteal panel. The spine relief zone of the gluteal panel may comprise a recess formed into the gluteal panel.

The gluteal panel may have an overall concave shape facing the user.

The gluteal panel may have a coccyx relief zone.

The coccyx relief zone may comprise a coccyx aperture in the gluteal panel.

The seat structure may comprise a perineal relief zone. The perineal relief zone may comprise a perineal aperture in the seat structure.

The thigh support region may comprise a left thigh panel and a right thigh panel where the left thigh panel and the right thigh panel are independently adjustable.

Each of the left thigh panel and the right thigh panel may be rotatable relative to the pelvic support region.

Each of the left thigh panel and the right thigh panel may be hingedly connected to the pelvic support region.

A length of each of the left thigh panel and the right thigh panel may be adjustable to accommodate a range of femur lengths.

The pelvic well may have a depth of about 3.8 cm (1.5 inch) relative to the thigh support region.

The back rest structure may comprise a thoracic panel disposed above the PSIS panel.

The thoracic panel may be adjustable by translation.

The thoracic panel may be adjustable by rotation.

The thoracic panel may provide two loading zones separated by a spine relief zone. The two loading zones of the thoracic panel may be adjacent the spine relief zone of the thoracic panel. The spine relief zone may comprise a recess formed into the thoracic panel.

The thoracic panel may have an overall concave shape facing the user.

In another aspect, the disclosure describes a structure of a seating system for a human user. The structure comprises:
 a frame;
 a seat structure supported by the frame, the seat structure comprising a thigh support region and a pelvic support region disposed behind the thigh support region, the thigh support region comprising a left thigh panel and a right thigh panel being adjustable independently of each other and relative to the pelvic support region; and
 a back rest structure supported by the frame.

Each of the left thigh panel and the right thigh panel may be rotatable relative to the pelvic support region.

Each of the left thigh panel and the right thigh panel may be hingedly connected to the pelvic support region.

A length of each of the left thigh panel and the right thigh panel may be adjustable to accommodate a range of femur lengths.

The pelvic support region may define a pelvic well for receiving an ischial tuberosity of the user and for providing a fulcrum for rotation of a pelvis of the user.

The back rest structure may comprise a posterior superior iliac spine (PSIS) panel adjustable to cause movement of a PSIS of the user and cooperate with the pelvic well to cause rotation of the pelvis of the user about the fulcrum provided by the pelvic well.

The pelvic well may have a depth of about 3.8 cm (1.5 inch) relative to the thigh support region.

The PSIS panel may be adjustable by translation.

The PSIS panel may be adjustable by rotation.

The PSIS panel may provide two loading zones separated by a spine relief zone. The two loading zones of the PSIS panel may be adjacent the spine relief zone of the PSIS panel.

The spine relief zone the PSIS panel may comprise a recess formed into the PSIS panel.

The PSIS panel may have an overall concave shape facing the user.

The back rest structure may comprise a gluteal panel for supporting a gluteal mass of the user.

The gluteal panel may be adjustable by translation.

The gluteal panel may be adjustable by rotation.

The gluteal panel may provide two loading zones separated by a spine relief zone. The two loading zones of the gluteal panel may be adjacent the spine relief zone of the gluteal panel.

The spine relief zone may comprise a recess formed into the gluteal panel.

The gluteal panel may have an overall concave shape facing the user.

The gluteal panel may have a coccyx relief zone. The coccyx relief zone may comprise a coccyx aperture in the gluteal panel.

The seat structure may comprise a perineal relief zone.

The perineal relief zone may comprise a perineal aperture in the seat structure.

The back rest structure may comprise a thoracic panel disposed above the PSIS panel.

The thoracic panel may be adjustable by translation.

The thoracic panel may be adjustable by rotation.

The thoracic panel may comprise two loading zones separated by a spine relief zone. The two loading zones of the thoracic panel may be adjacent the spine relief zone of the thoracic panel. The spine relief zone of the thoracic panel may comprise a recess formed into the thoracic panel.

The thoracic panel may have an overall concave shape facing the user.

At least part of the seat structure may be adjustable by translation relative to the frame.

The pelvic support region of the seat structure may be adjustable substantially along a horizontal direction relative to the seating system.

In another aspect, the disclosure describes a structure of a seating system for a human user, the structure comprising:
 a frame;
 a seat structure supported by the frame; and
 a gluteal panel supported by the frame for supporting a gluteal mass of the user, the gluteal panel being adjustable by translation and by rotation relative to the frame.

The gluteal panel may comprise two loading zones separated by a spine relief zone. The two loading zones of the gluteal panel may be adjacent the spine relief zone of the gluteal panel.

The spine relief zone of the gluteal panel may comprise a recess formed into the gluteal panel.

The gluteal panel may have an overall concave shape facing the user.

The gluteal panel may have a coccyx relief zone. The coccyx relief zone may comprise a coccyx aperture in the gluteal panel.

In another aspect, the disclosure describes a structure of a seating system for a human user, the structure comprising:
 a frame;
 a seat structure supported by the frame; and
 a posterior superior iliac spine (PSIS) panel supported by the frame, the PSIS panel being adjustable to cause movement of a PSIS of the user, the PSIS panel being adjustable by translation and by rotation relative to the frame.

The PSIS panel may comprise two loading zones separated by a spine relief zone.

The two loading zones of the PSIS panel may be adjacent the spine relief zone of the PSIS panel.

The spine relief zone of the PSIS panel may comprise a recess formed into the PSIS panel.

The PSIS panel may have an overall concave shape facing the user.

In another aspect, the disclosure describes a seating system comprising a structure as described herein.

In another aspect, the disclosure describes a vehicle seat comprising a structure as described herein.

In another aspect, the disclosure describes a wheelchair comprising a structure as described herein.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to adjustable seating systems designed to support the human form during sitting. In various embodiments, seating systems as disclosed herein may reduce pressure on parts of the human anatomy that are less capable of handling such pressure for extended periods of time. In some embodiments, this may be achieved by transferring (i.e., re-distributing) loads to parts of the anatomy that are more capable of withstanding pressure. In some cases, the seating systems as disclosed herein may contribute toward reducing pain, fatigue and lower extremity problems that are often experienced by those that sit in conventional seats for long periods of time.

Aspects of various embodiments are described through reference to the drawings.

Figure 1:
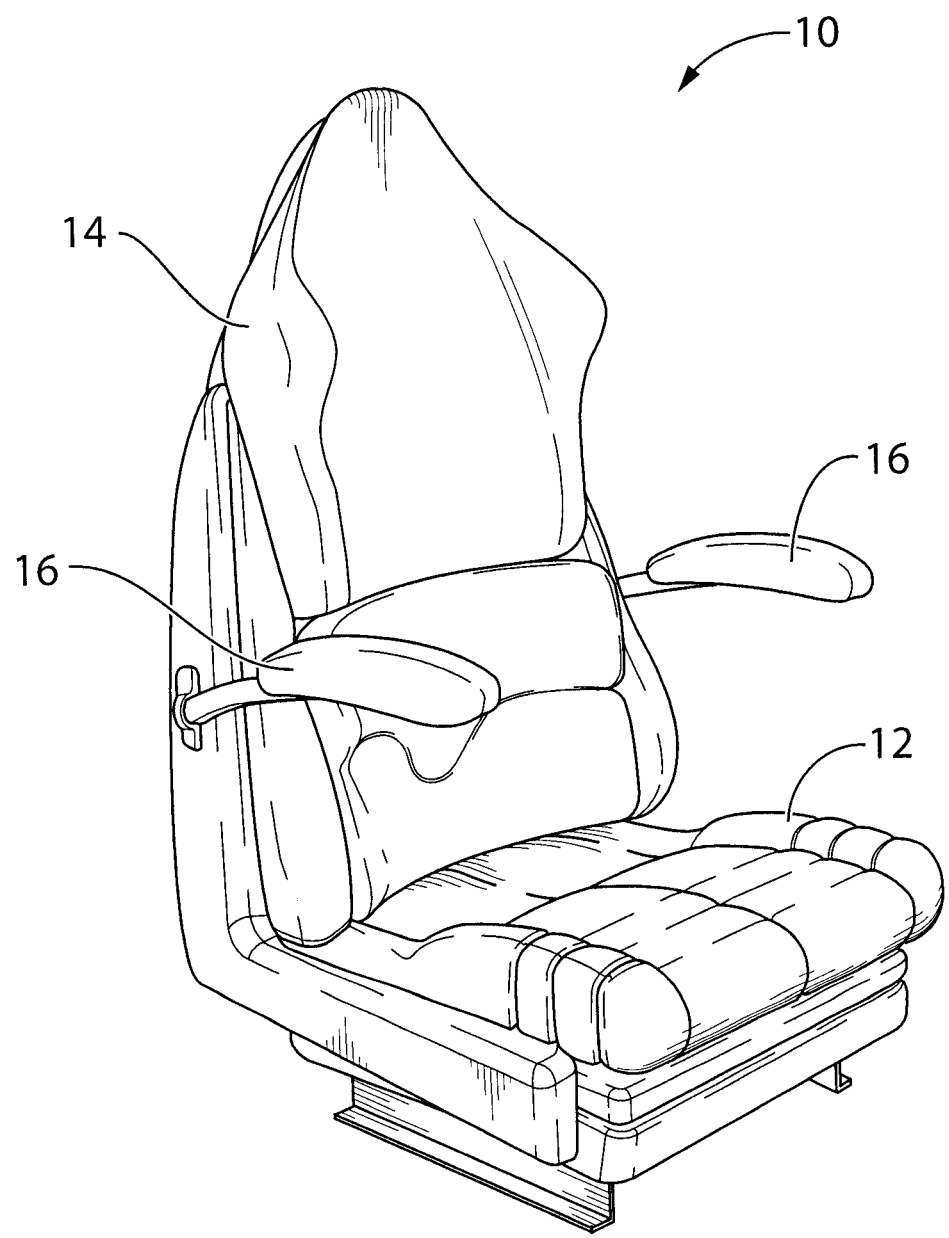
FIG. 1 is a perspective view of an exemplary seating system in accordance with the present disclosure.

FIG. 1 is a perspective view of an exemplary seating system 10 in accordance with the present disclosure. Seating system 10 may comprise seat portion 12, back rest portion 14 and one or more armrests 16. Seating system 10 may be suitable for use in several applications/industries where a human user would be required to sit for relatively long periods of time (e.g., vehicle drivers/operators, office workers). For example, seating system 10 may be suitable for use as a vehicle seat or an office chair. In some embodiments, vehicle seat 10 may be a driver's and/or passenger's seat for a vehicle such as a truck (i.e., of a tractor-trailer), aircraft, car, bus, train, heavy machinery, military vehicle, marine vehicle, etc. In some embodiments, seating system 10 may be (or be part of) one of: an office chair, a task chair, a wheelchair (e.g., motorized or manual), a scooter, a control room chair, etc.

Figure 2:
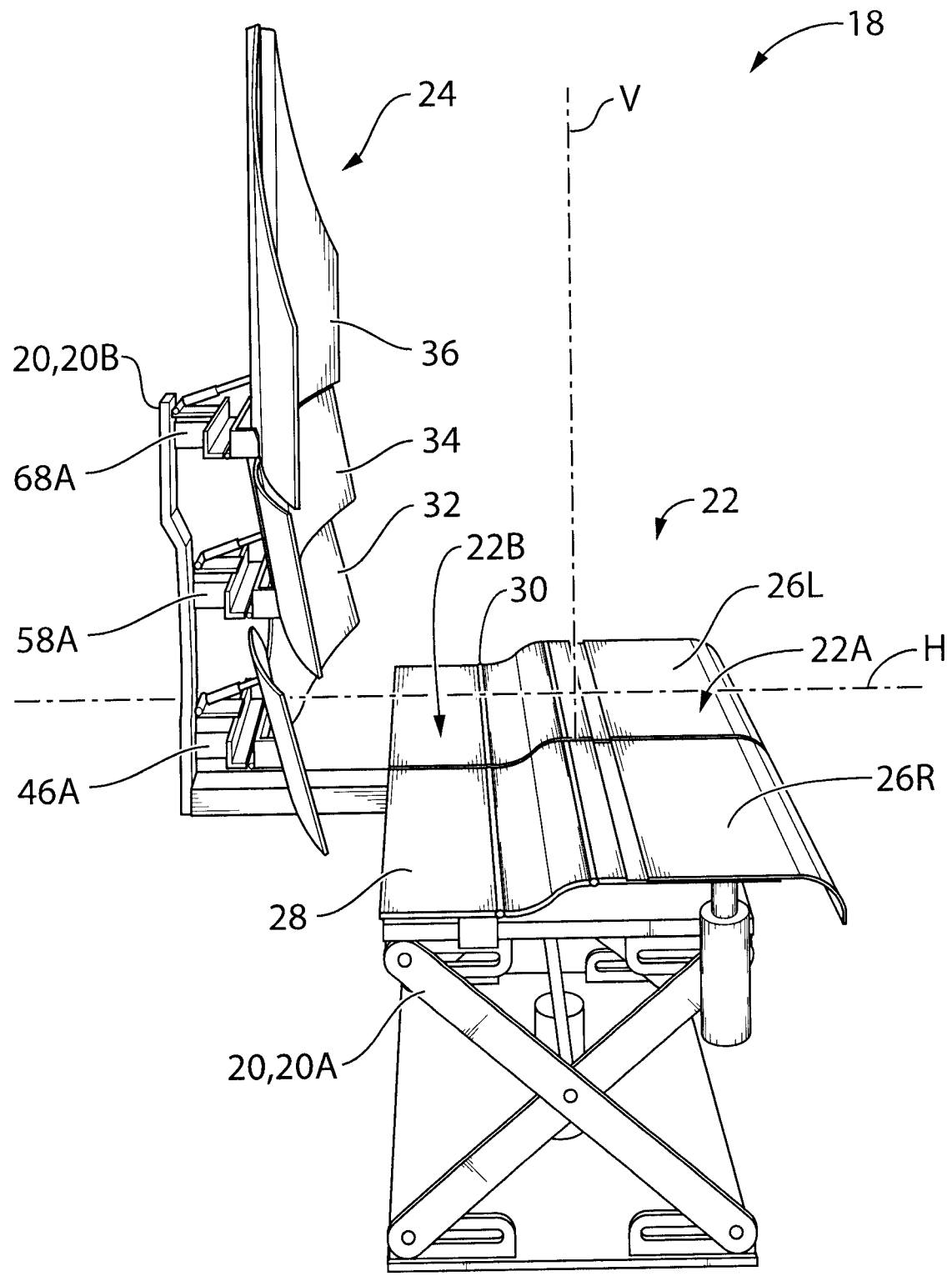
FIG. 2 is a perspective view of an exemplary structure of the seating system of FIG. 1.

FIG. 2 is a perspective view of an exemplary support structure 18 of seating system 10. Structure 18 may be disposed internally of seating system 10. For example, seating system 10 may comprise coverings, padding, cushions, stuffing, foam, leather, etc. that at least partially conceals structure 18. In other words, seating system 10 may be upholstered so that at least part of structure 18 may be concealed.

In the context of the present disclosure, the term "vertical" is used to represent a direction that is generally along line "V" represented in FIG. 2 in relation to structure 18 and/or seating system 10. Similarly, references made to "raised" or "lowered" are made in relation to movement in respective opposite directions that are generally along line "V". References made to "above" and "below" are also made in relation to a line generally along line "V". Also, the expression "horizontal" is used to represent a direction that is generally along line "H" represented in FIG. 2 in relation to structure 18 and/or seating system 10. Similarly, references made to "forward", "rearward" are made in relation to respective opposite directions that are generally along line "H". References made to "behind" are also made in relation to a line generally along line "H".

Structure 18 may comprise frame 20. Frame 20 may be of unitary construction or may comprise a plurality of parts that may or may not be structurally connected to each other. For example, frame 20 may comprise first frame portion 20A that supports one or more parts of seat structure 22, and, second frame portion 20B that supports one or more parts of back rest structure 24. In some embodiments, first frame portion 20A and second frame portion 20B may be secured together to provide support for seating system 10. In this case, seating system 10 could be secured to another structure (e.g., floor of a vehicle interior) only via first frame 20A for example. Alternatively, first frame portion 20A and second frame portion 20B may be separate and hence be separately secured to neighboring structure(s). For example, in some embodiments, first frame portion 20A could be configured to be secured to a floor of a vehicle interior and second frame portion 20B could be configured to be secured to a wall of a vehicle interior. In the case of seating system 10 being an office chair, one or more ground-engaging rollers and/or legs could be part of first frame portion 20A or secured to first frame portion 20A. Similarly, in the case of seating system 10 being a wheelchair a plurality of ground-engaging wheels could be secured to first frame portion 20A.

In some embodiments, first frame portion 20A may comprise some mechanism(s) for adjusting the height (i.e., along line V) of seat structure 22. For example, first frame portion 20A may comprise a scissor-type or other type of mechanism for controlling movement of seat structure 22. First frame portion 20A may also comprise or be coupled to actuator 25 (see FIG. 5) that may cause rising and/or lowering of seat structure 22.

Seat structure 22 may be supported by first frame portion 20A. Seat structure 22 may comprise thigh support region 22A and pelvic support region 22B. Pelvic support region 22B may be disposed behind thigh support region 22A. Thigh support region 22A may comprise left thigh panel 26L and right thigh panel 26R. As explained further below, left thigh panel 26L and/or right thigh panel 26R may be adjustable relative to pelvic support region 22B. In some embodiments, left thigh panel 26L and right thigh panel 26R may be adjustable relative to each other. Pelvic support region 22B may define pelvic well 28 for receiving an ischial tuberosity (see element 84 in FIGS. 17A and 17B) of the user and also provide a fulcrum for rotation of a pelvis (see element 78 in FIGS. 17A and 17B) of the user. Left thigh panel 26L and/or right thigh panel 26R may be hingedly connected to pelvic support region 22B via hinge 30.

Back rest structure 24 may be supported by second frame portion 20B. Back rest structure 24 may comprise gluteal panel 32 for supporting a gluteal mass of the user. Back rest structure 24 may also comprise posterior superior iliac spine (PSIS) panel 34 disposed above gluteal panel 32. Back rest structure 24 may also comprise thoracic panel 36 disposed above PSIS panel 34. As explained below, PSIS panel 34 may be adjustable to cause movement of a PSIS (see element 86 in FIGS. 17A and 17B) of the user and cooperate with pelvic well 28 to cause rotation of the pelvis of the user about the fulcrum provided by pelvic well 28.

Figure 3:
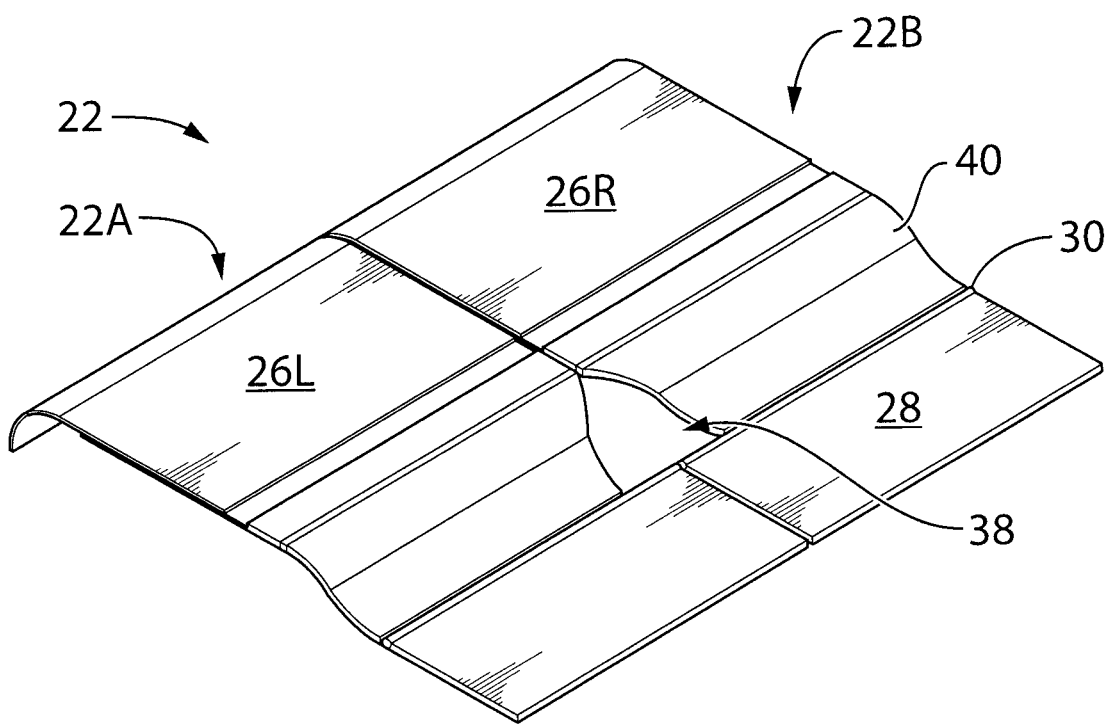
FIG. 3 is a rear perspective view of an exemplary seat structure of the seating system of FIG. 1.

FIG. 3 is a rear perspective view of an exemplary embodiment of seat structure 22. Seat structure 22 may comprise perineal relief zone 38 which may reduce or substantially eliminate pressure to be applied to the perineum of the user. In some embodiments, perineal relief zone 38 may comprise an aperture formed in seat structure 22. For example, the aperture of the perineal relief zone 38 may be formed in transition wall 40 between thigh support region 22A and pelvic support region 22B. Perineal relief zone 38 may be formed forward of hinge 30 and may comprise a cut-out provided in each of left thigh panel 26L and right thigh panel 26R.

Figure 4:
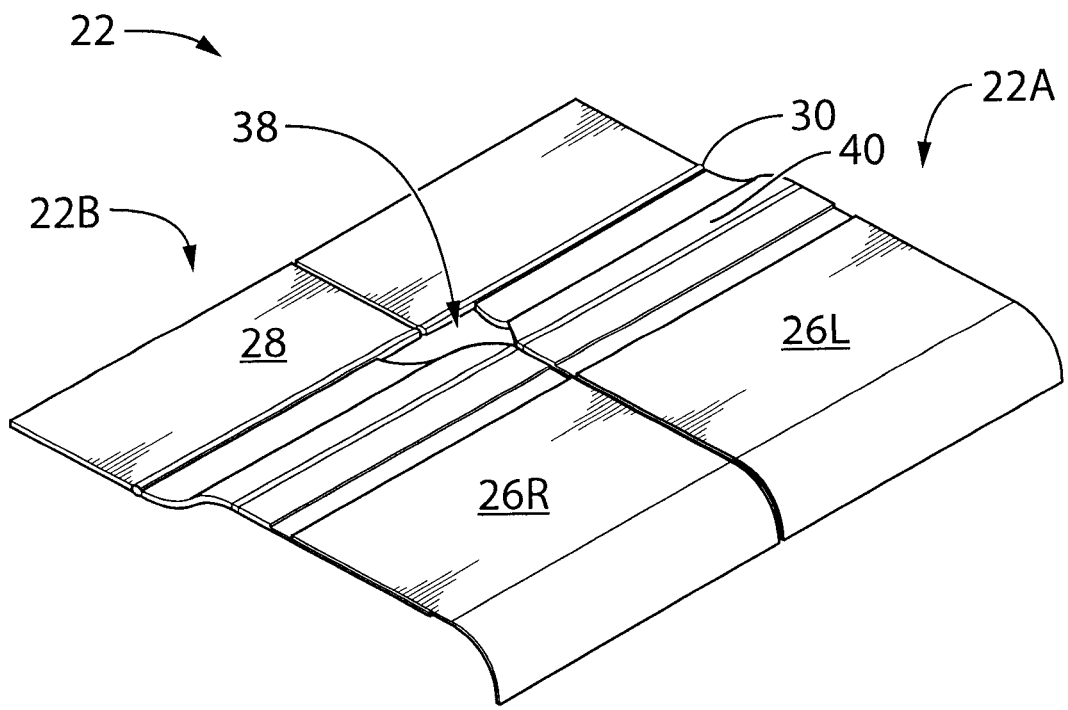
FIG. 4 is a front perspective view of the seat structure of FIG. 3.

FIG. 4 is a front perspective view of seat structure 22. In some embodiments, pelvic well 28 may have a depth of about 3.8 cm (1.5 in) relative to thigh support region 22A when left thigh panel 26L and/or right thigh panel 26R are at a neutral position as shown in FIG. 4.

Figure 5:
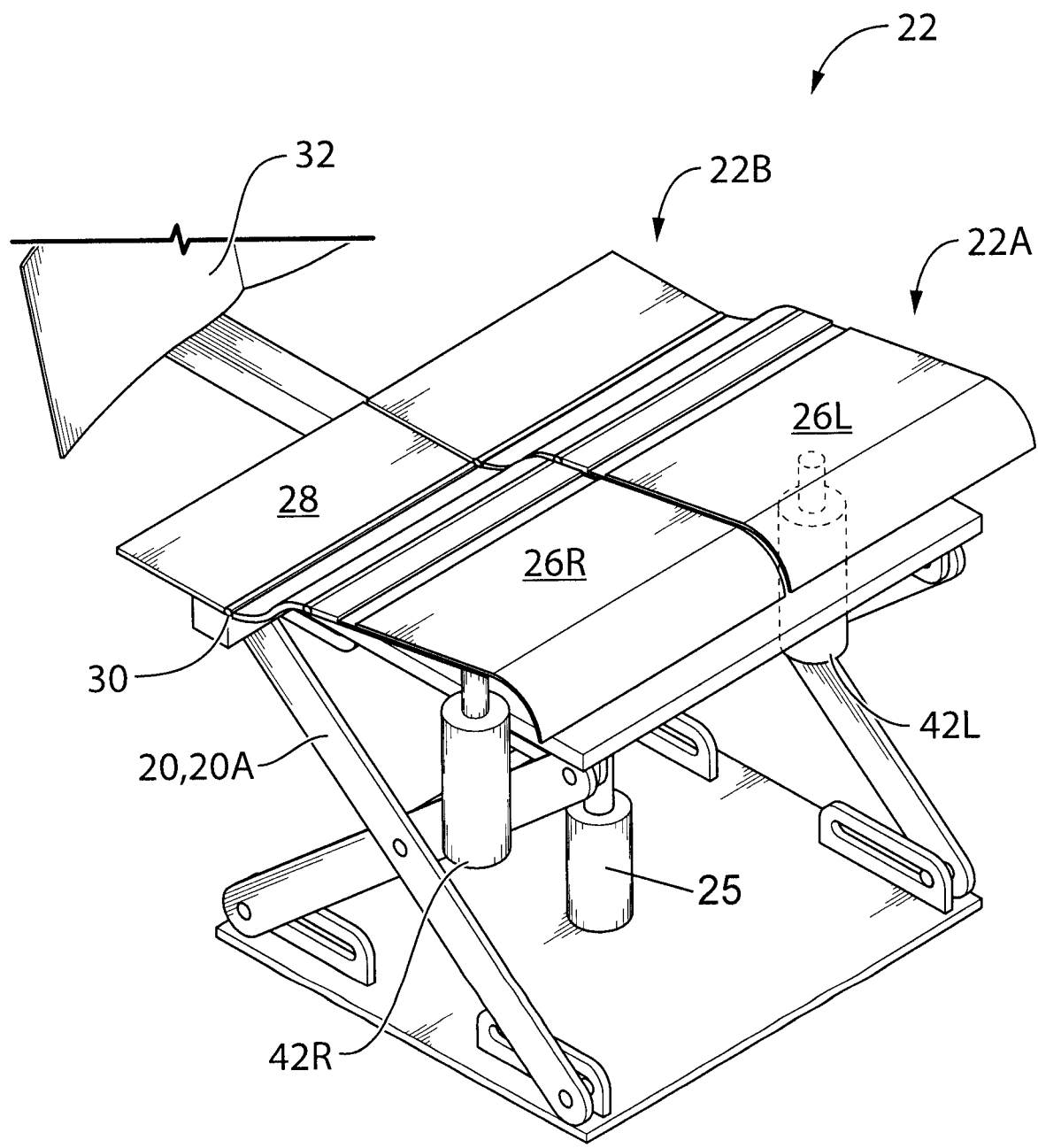
FIG. 5 is a perspective view of another exemplary seat structure of the seating system of FIG. 1 where a left thigh panel and a right thigh panel are both raised.
Figure 6:
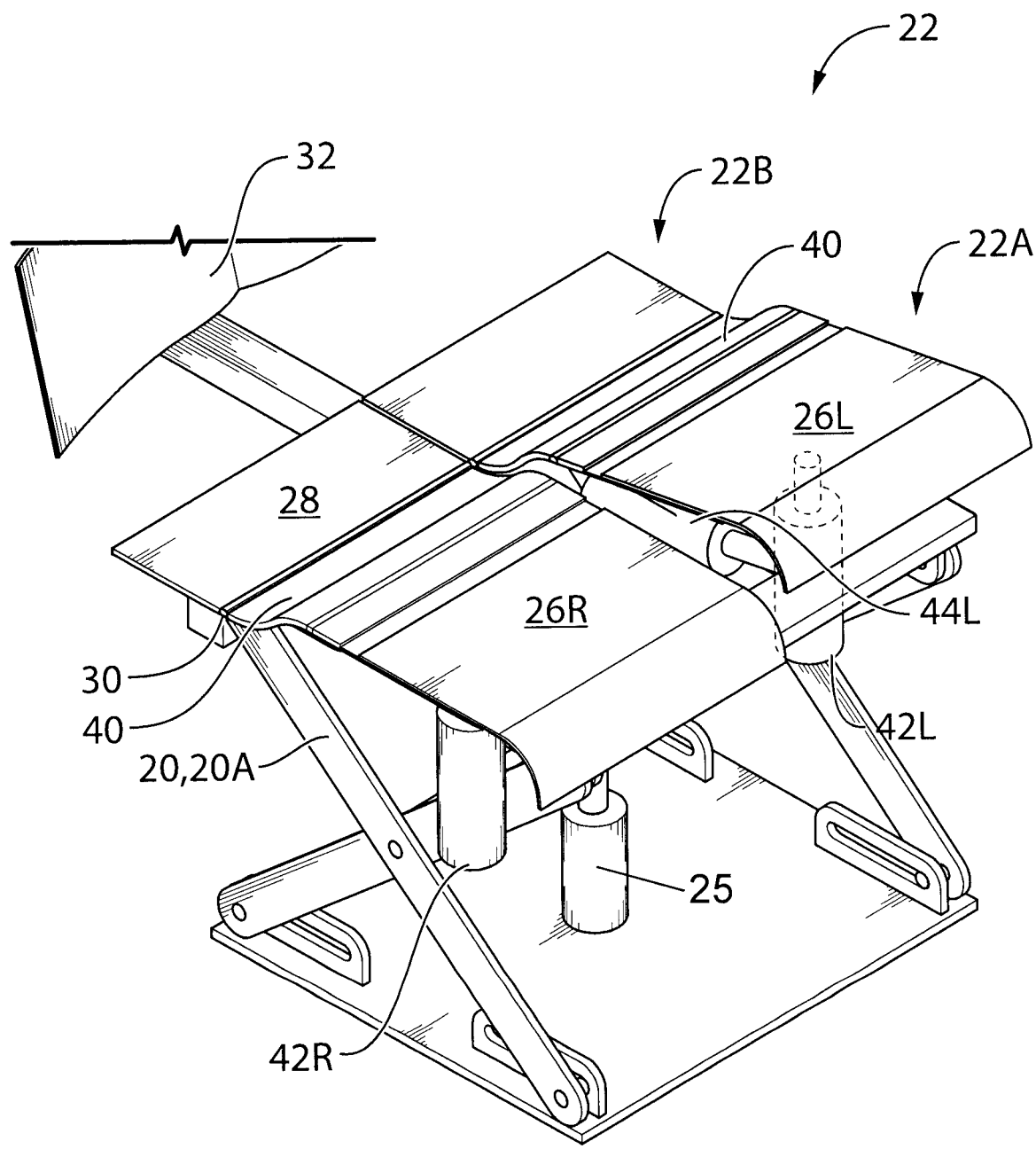
FIG. 6 is a perspective view of the seat structure of FIG. 5 where only the left thigh panel is raised.

FIG. 5 is a perspective view of seat structure 22 where left thigh panel 26L and right thigh panel 26R are both raised. FIG. 6 is a perspective view of seat structure 22 where left thigh panel 26L is raised and right thigh panel 26R is lowered (e.g., at a neutral position). In some embodiments, one or both of left thigh panel 26L and right thigh panel 26R may be adjustable. For example, actuator 42L may be secured to frame 20 and actuatable to cause raising of at least a portion of left thigh panel 26L. In some embodiments, actuator 42L may cause rotation of left thigh panel 26L about hinge 30. Similarly, actuator 42R may be secured to frame 20 and actuatable to cause raising of at least a portion of right thigh panel 26R. In some embodiments, actuator 42R may cause rotation of right thigh panel 26R about hinge 30. Actuators 42L and 42R may be independently actuatable so that left thigh panel 26L and right thigh panel 26R may be raised/rotated by the same or different amounts.

Such adjustment of left thigh panel 26L and right thigh panel 26R may be desirable for drivers' seats for vehicles or other situations where the user may use one or more feet to actuate one or more pedals (e.g., accelerator, brake and/or clutch pedals) and/or other types of foot controls. Actuators 42L, 42R may be of any suitable type. For example, actuators 42L, 42R may be of the mechanical, hydraulic, electric and/or pneumatic type. In some embodiments, actuators 42L, 42R may be actuated from a power source other than the user and/or be manually actuated by the user.

In some embodiments, actuators 42L and 42R may provide substantially rigid positional adjustment of left thigh panel 26L and right thigh panel 26R. However, in some embodiments, one or more of actuators 42L and 42R may provide non-rigid positional adjustment of the corresponding one or more of left thigh panel 26L and right thigh panel 26R so as to permit movement of left thigh panel 26L and/or right thigh panel 26R if the user desires to do so by exerting a sufficient amount of force on left thigh panel 26L and/or right thigh panel 26R. For example, actuators 42L and 42R may be configured to provide a predetermined amount of resistance to movement of left thigh panel 26L and/or right thigh panel 26R that may be exerted by the user. In some embodiments, such predetermined amount of force may be adjustable to suit the user's preference. For example, after having raised one of left thigh panel 26L and/or right thigh panel 26R, the corresponding actuator 42L and/or 42R may provide a resilient resistance to downward movement so as to urge left thigh panel 26L and/or right thigh panel 26R back to the raised position following downward movement exerted by the user. This type of resilient resistance may be beneficial in assisting a vehicle driver that must repeatedly depress and release the clutch pedal for example to operate a manual transmission of the vehicle.

Figure 7:
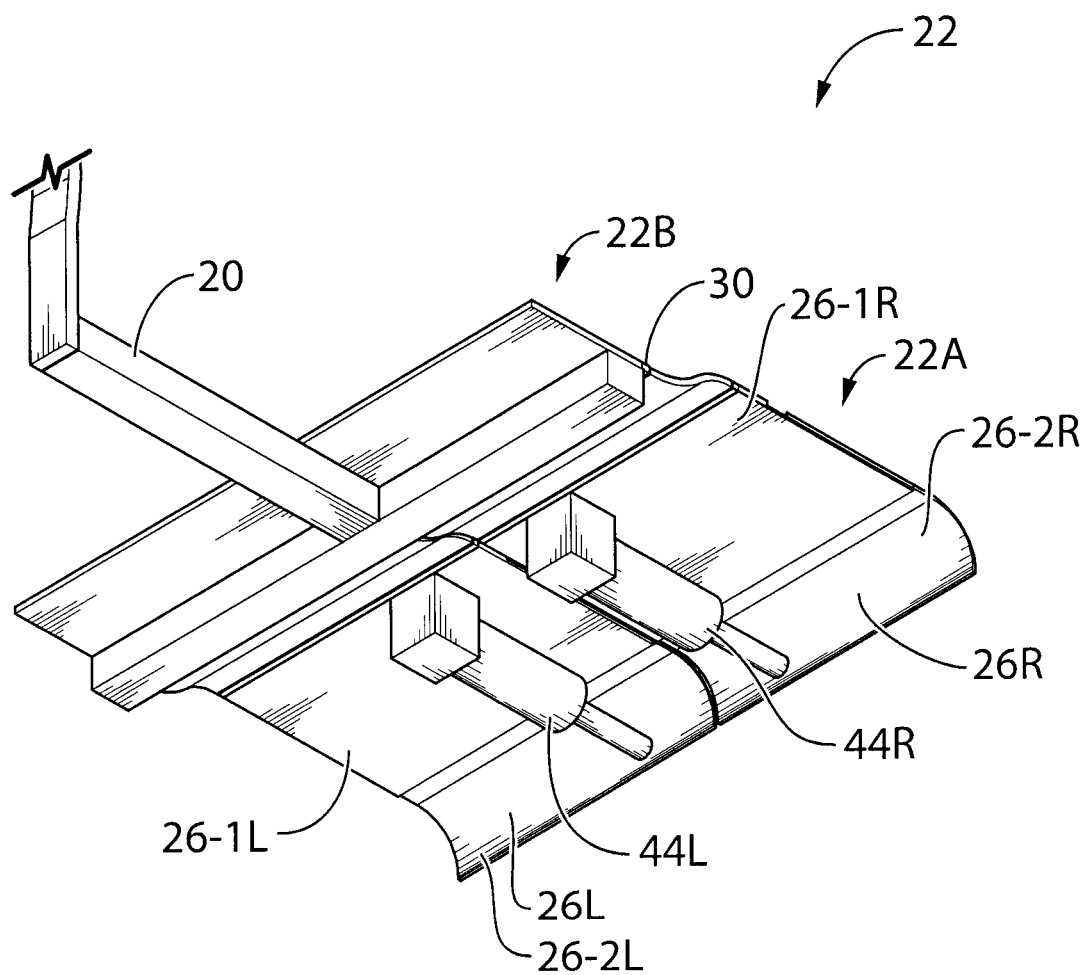
FIG. 7 is a perspective bottom view of the seat structure of FIG. 5 showing actuators for respectively adjusting a length of the left thigh panel and a length of the right thigh panel to accommodate a range of femur lengths where both the left thigh panel and the right thigh panel are extended.

FIG. 7 is a perspective bottom view of seat structure 22 showing actuators 44L and 44R for adjusting a length of left thigh panel 26L and right thigh panel 26R respectively to accommodate a range of femur lengths between different users. In some embodiments, the amount of length adjustment between a retracted position and an extended position may be about 3 inches (7.6 cm). FIG. 7 shows both left thigh panel 26L and right thigh panel 26R being extended by the same amount. For example, lengthening thigh panels 26L and 26R based on femur length may allow for pressure between the thighs of a user and the thigh panels 26L and 26R to be more evenly distributed over a greater area of the thighs of the user. For example, for a user having a longer femur, the surface area of the user's thigh(s) may be increased so as to provide a larger surface area of thigh panels 26L and/or 26R for the thigh(s) to interface with. Alternatively, thigh panels 26L and/or 26R may be shortened to accommodate a user with shorter femurs.

Right thigh panel 26R may comprise overlapping subpanels 26-1R and 26-2R that may be translatable (e.g., slidable) relative to each other to achieve extension and retraction of right thigh panel 26R. Accordingly, actuator 44R may be coupled to subpanels 26-1R and 26-2R to cause relative movement between subpanels 26-1R and 26-2R to achieve extension and retraction of right thigh panel 26R. Similarly, Left thigh panel 26L may comprise overlapping subpanels 26-1L and 26-2L that may be translatable (e.g., slidable) relative to each other to achieve extension and retraction of left thigh panel 26L. Accordingly, actuator 44L may be coupled to subpanels 26-1L and 26-2L to cause relative movement between subpanels 26-1L and 26-2L to achieve extension and retraction of left thigh panel 26L.

Figure 8:
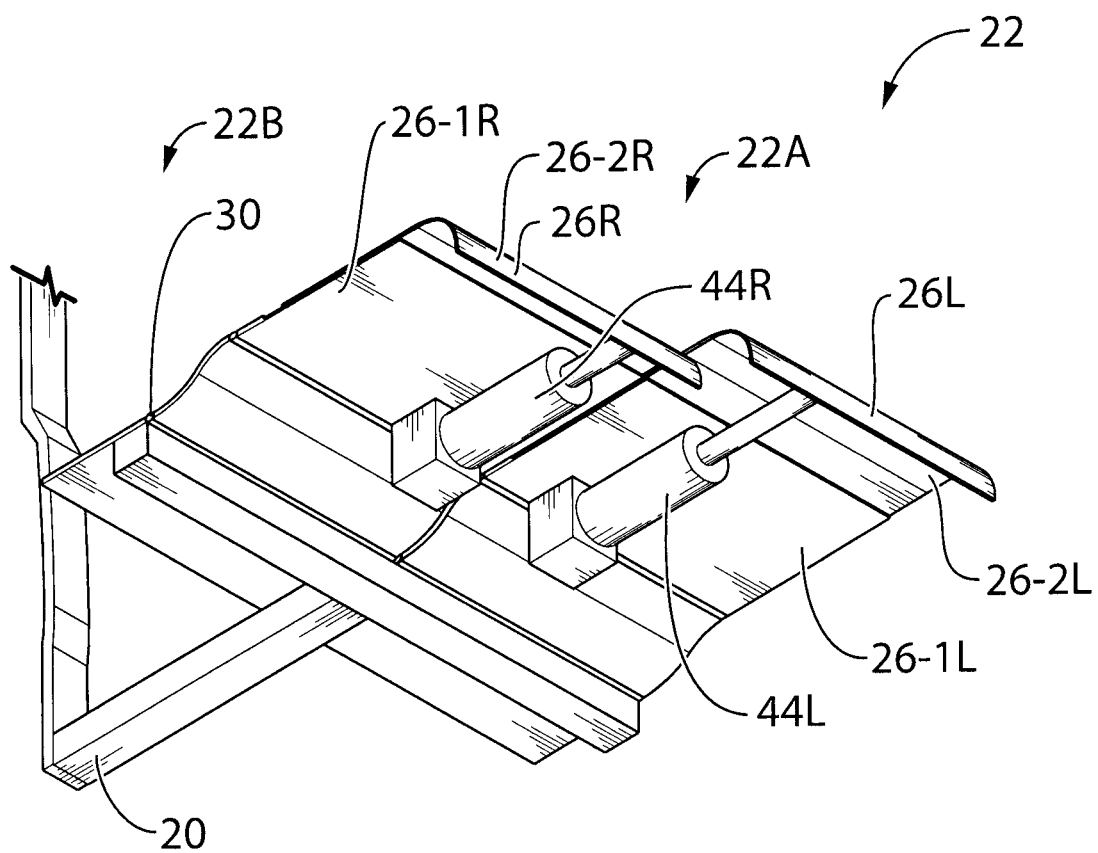
FIG. 8 is a perspective bottom view of the seat structure of FIG. 5 showing the actuators for respectively adjusting the length of the left thigh panel and the length of the right thigh panel to accommodate a range of femur lengths where only the left thigh panel is extended.

FIG. 8 is a perspective bottom view of seat structure 22 showing actuators 44L and 44R for adjusting a length of left thigh panel 26L and right thigh panel 26R respectively where left thigh panel 26L is extended but right thigh panel 26R is retracted. Actuators 44L and 44R may be independently actuatable so that left thigh panel 26L and right thigh panel 26R may be extended/retracted to have the same or different lengths. Such adjustment of left thigh panel 26L and right thigh panel 26R may be desirable for drivers' seats for vehicles or other situation where the user may use one or more feet to actuate one or more pedals (e.g., accelerator, brake and/or clutch pedals) and/or other types of foot controls. Actuators 44L, 44R may be of any suitable type. For example, actuators 44L, 44R may be of the mechanical, hydraulic, electric and/or pneumatic type. In some embodiments, actuators 44L, 44R may be actuated from a power source other than the user and/or be manually actuated by the user.

Figure 9:
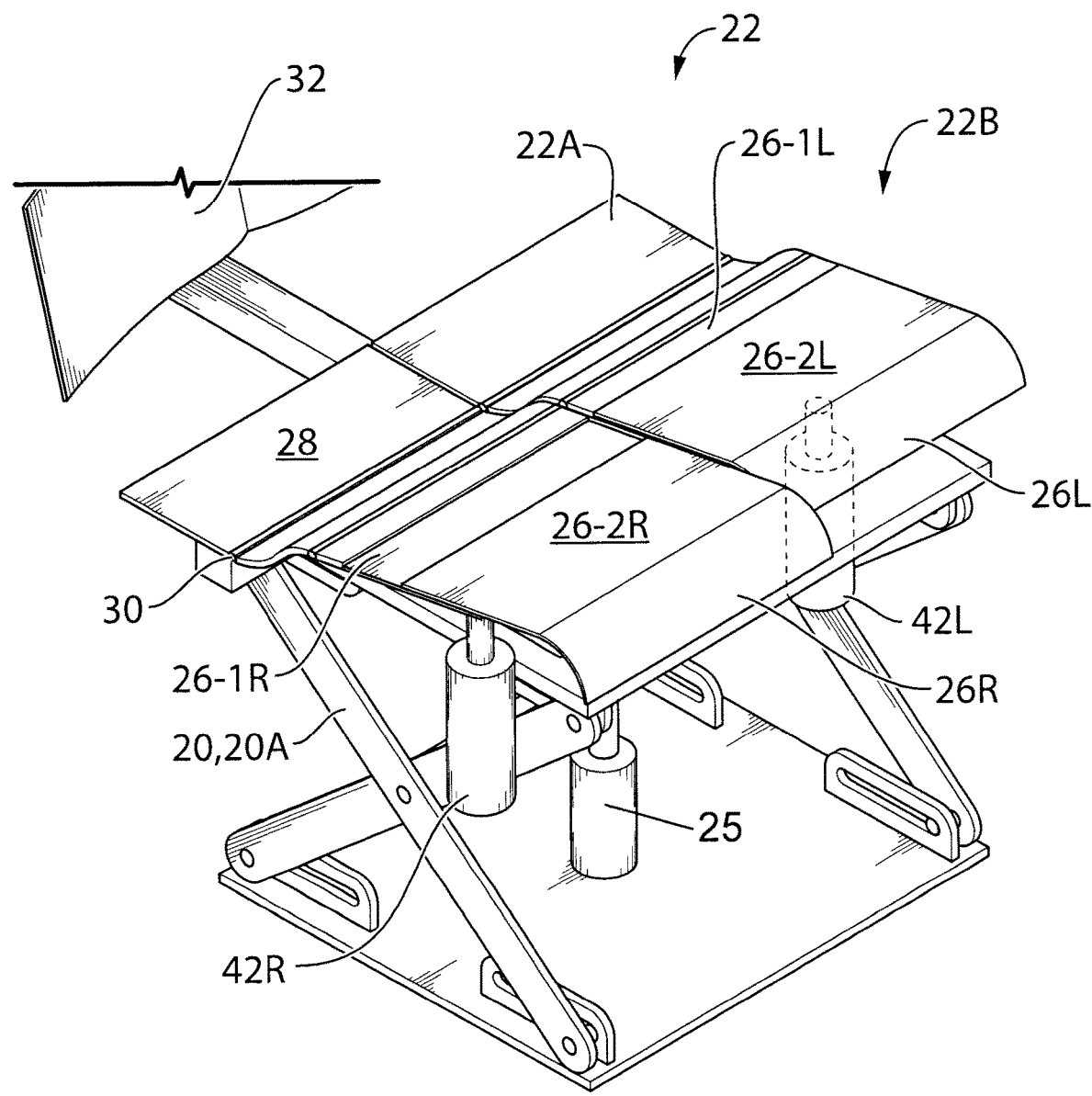
FIG. 9 is a perspective view of the seat structure of FIG. 5 showing the left thigh panel and the right thigh panel raised and where only the right thigh panel is extended.

FIG. 9 is a perspective view of the seat structure 22 showing left thigh panel 26L and right thigh panel 26R being both raised but where only right thigh panel 26R is extended.

Figure 10A:
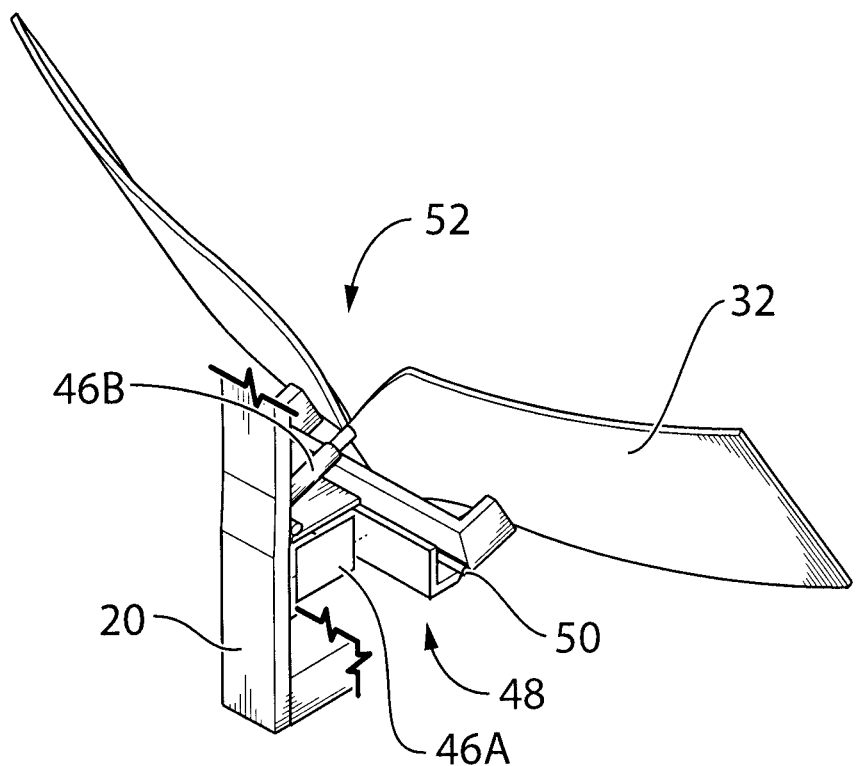
FIGS. 10A and 10B respectively show perspective views of an exemplary gluteal panel of the structure of FIG. 2 in first and second positions.
Figure 10B:
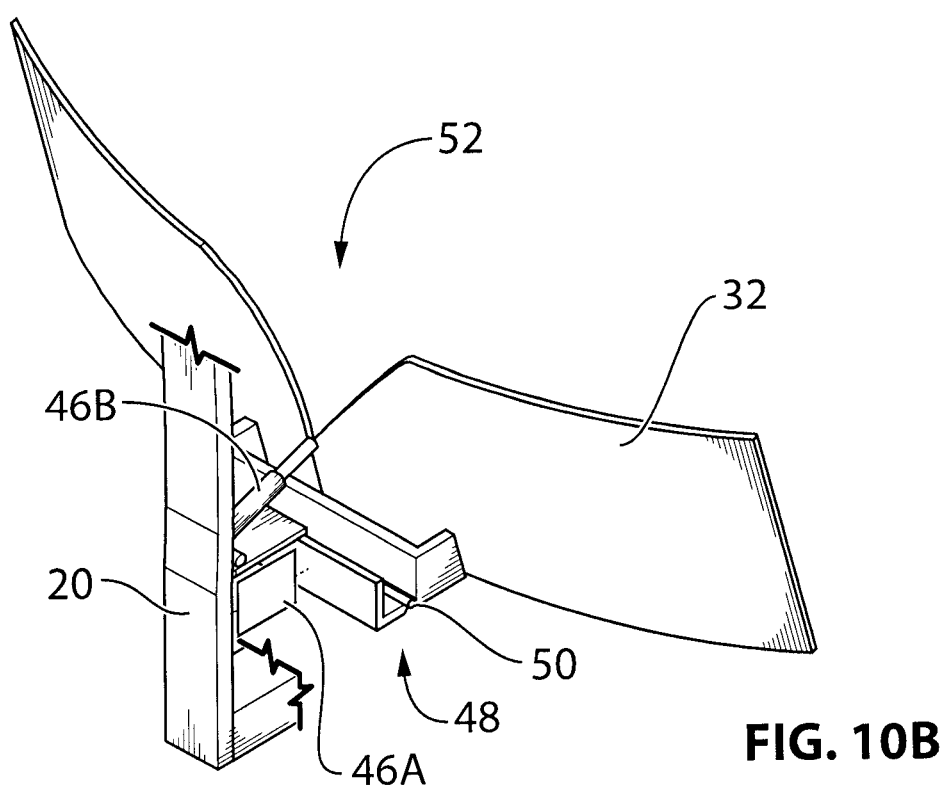

FIGS. 10A and 10B show perspective views of gluteal panel 32 in first and second positions respectively. As explained above, gluteal panel 32 may support at least part of the gluteal mass of the user and may be adjustable to accommodate different body types and sizes. In some embodiments, gluteal panel 32 may be adjustable in one or more degrees of freedom. For example, gluteal panel 32 may be adjustable by translation and/or rotation. For example, gluteal panel 32 may be translatable toward and away from frame 20 via first actuator 46A. Gluteal panel 32 may also be rotatable (i.e., tiltable) relative to frame 20 via second actuator 46B. For example, gluteal panel 32 may be tilted rearwardly relative to a vertical direction (see line "H" in FIG. 2) so as to support at least some of the weight of the user by loading the gluteal mass of the user. In some embodiments, gluteal panel 32 may have a range of motion including about 15 degrees of angular adjustment and about 4 inches (10 cm) of horizontal adjustment. In some embodiments, gluteal panel 32 may be adjustable in the vertical direction by about 3 inches (7.2 cm).

For example, gluteal panel 32 may be movably connected to frame 20 via first actuator 46A and bracket 48. Bracket 48 may comprise hinge 50 that may permit rotation of gluteal panel 32 by the actuation of actuator 46B. Second actuator 46B may be connected to gluteal panel 32 and bracket 48 in order to cause rotation of gluteal panel 32 about hinge 50. Alternatively, second actuator 46B could be connected directly to frame 20 in some embodiments. Gluteal panel 32 may comprise coccyx relief zone 52. Coccyx relief zone 52 may comprise a coccyx aperture in gluteal panel 32 that is configured to prevent or reduce an amount of pressure being applied from gluteal panel 32 directly to the coccyx of the user.

Actuators 46A, 46B may be of any suitable type. For example, actuators 46A, 46B may be of the mechanical, hydraulic, electric and/or pneumatic type. In some embodiments, one or more of actuators 46A, 46B may comprise a scissor mechanism. In some embodiments, actuators 46A, 46B may be actuated from a power source other than the user and/or be manually actuated by the user. In some embodiments, one or more of actuators 46A, 46B may provide a passive resistance that may permit movement of gluteal panel 32 upon the application of an amount of force that may be predetermined. In some embodiments, actuators 46A, 46B may be configured so that such predetermined amount of force may be adjustable.

Figure 11A:
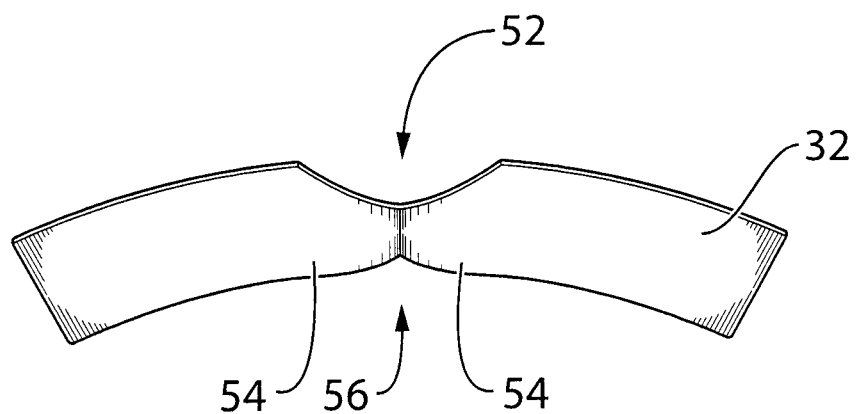
FIGS. 11A-11C are perspective views of the gluteal panel of FIGS. 10A and 10B from different viewpoints.
Figure 11B:
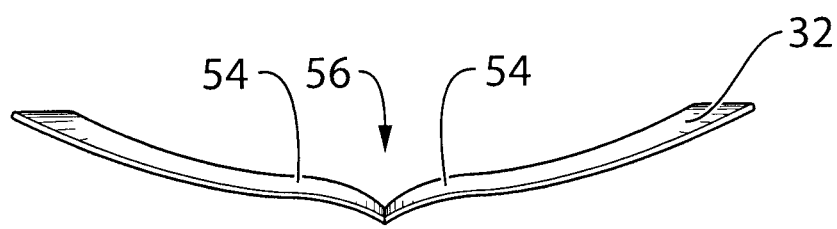
Figure 11C:
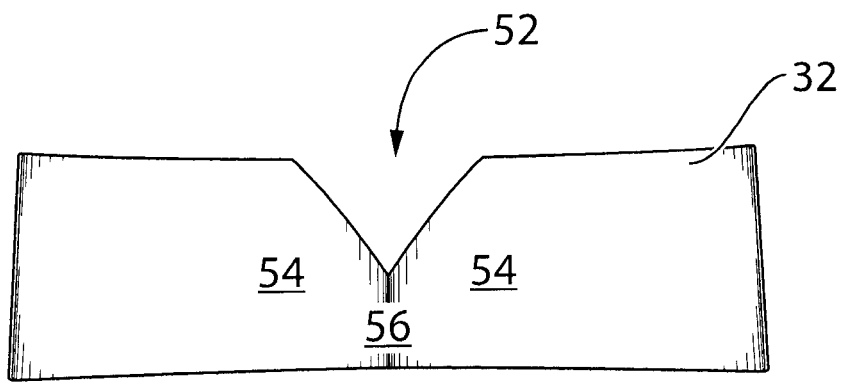

FIG. 11A is a top perspective view of gluteal panel 32, FIG. 11B is an edge-on perspective view of gluteal panel 32 and FIG. 11C is a front perspective view of gluteal panel 32. Gluteal panel 32 may comprise one or more loading zones 54 for applying pressure on and/or supporting the user. For example, gluteal panel 32 may comprise two loading zones 54 separated by spine relief zone 56. Loading zones 54 may comprise surface areas of gluteal panel 32 that are used to apply pressure to the gluteal mass of the user so as to provide support for the user. Loading zones 54 of gluteal panel 32 may be adjacent spine relief zone 56 of gluteal panel 32. Spine relief zone 56 of gluteal panel 32 may comprise a recess formed into gluteal panel 32 so as to reduce or substantially eliminate pressure from being transmitted from gluteal panel 32 directly to the spine of the user. Spine relief zone 56 may extend across some or all of the height (i.e., along the spine of the user) of gluteal panel 32 and loading zones 54 may correspondingly comprise surface areas adjacent spine relief zone 56 extending across some or all of the height of thoracic panel 34. As shown in FIG. 11B, gluteal panel 32 may have an overall concave shape facing the user for accommodating part (e.g., the gluteal mass) of the user. Loading zones 54 may also be separated by coccyx relief zone 52. For example, loading zones 54 of gluteal panel 32 may be adjacent coccyx relief zone 56 of gluteal panel 32.

Figure 12:
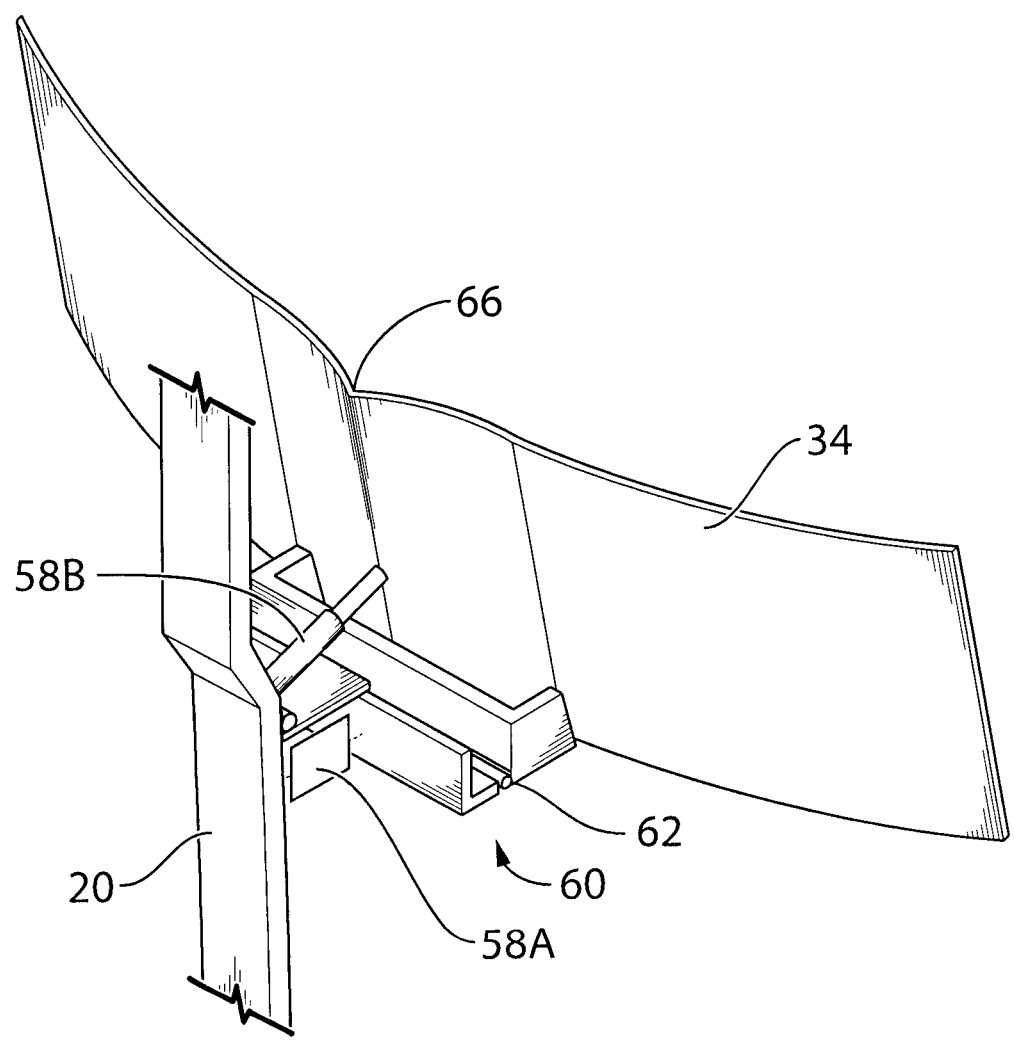
FIG. 12 is a perspective view of an exemplary posterior superior iliac spine (PSIS) panel of the structure of FIG. 2.

FIG. 12 shows a perspective view of PSIS panel 34 which may be part of back rest structure 24. Similar to gluteal panel 32, PSIS panel 34 may support part of the user and may be adjustable to accommodate different body types and sizes. In some embodiments, PSIS panel 34 may be adjustable in one or more degrees of freedom. For example, PSIS panel 34 may be adjustable by translation and/or rotation. For example, PSIS panel 34 may be translatable toward and away from frame 20 via first actuator 58A. PSIS panel 34 may also be rotatable (i.e., tiltable) relative to frame 20 via second actuator 58B. For example, PSIS panel 34 may be movably connected to frame 20 via first actuator 58A and bracket 60. Bracket 60 may comprise hinge 62 that may permit rotation of PSIS panel 34 by the actuation of actuator 58B. Second actuator 58B may be connected to PSIS panel 34 and bracket 60 in order to cause rotation of PSIS panel 34 about hinge 62. Alternatively, second actuator 58B could be connected directly to frame 20 in some embodiments. In some embodiments, PSIS panel 34 may have a range of motion including about 15 degrees of angular adjustment and about 4 inches (10 cm) of horizontal adjustment.

Actuators 58A, 58B may be of any suitable type. For example, actuators 58A, 58B may be of the mechanical, hydraulic, electric and/or pneumatic type. In some embodiments, one or more of actuators 58A, 58B may comprise a scissor mechanism. In some embodiments, actuators 58A, 58B may be actuated from a power source other than the user and/or be manually actuated by the user. In some embodiments, one or more of actuators 58A, 58B may provide a passive resistance that may permit movement of PSIS panel 34 upon the application of an amount of force that may be predetermined. In some embodiments, actuators 58A, 58B may be configured so that such predetermined amount of force may be adjustable.

Figure 13A:
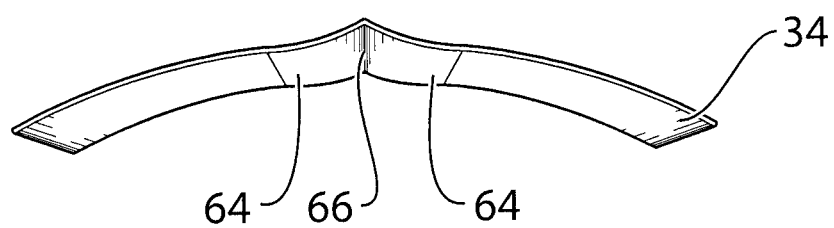
FIGS. 13A and 13B are perspective views of the PSIS panel of FIG. 12 from different viewpoints.
Figure 13B:
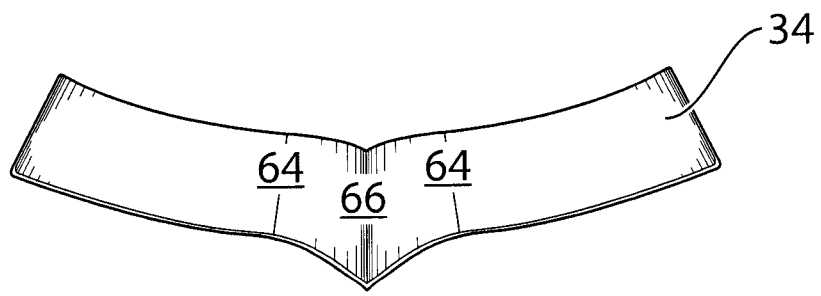

FIGS. 13A and 13B are perspective views of PSIS panel 34 from different viewpoints. PSIS panel 34 may comprises one or more loading zones 64 for applying pressure on and/or supporting the user. For example, PSIS panel 34 may comprise two loading zones 64 separated by spine relief zone 66. Loading zones 64 may comprise surface areas of PSIS panel 34 that are used to apply pressure on part of the user so as to provide support for the user. For example, loading zones 64 of PSIS panel 34 may be adjacent spine relief zone 66 of PSIS panel 34. Spine relief zone 66 of PSIS panel 34 may comprise a recess formed into PSIS panel 34 so as to reduce or substantially eliminate pressure from being transmitted from PSIS panel 34 directly to the spine of the user. Spine relief zone 66 may extend across some or all of the height (i.e., along the spine of the user) of PSIS panel 34 and loading zones 64 may correspondingly comprise surface areas adjacent spine relief zone 66 extending across some or all of the height of PSIS panel 34. As shown in FIGS. 13A and 13B, PSIS panel 34 may have an overall concave shape facing the user for accommodating part of the user.

Figure 14:
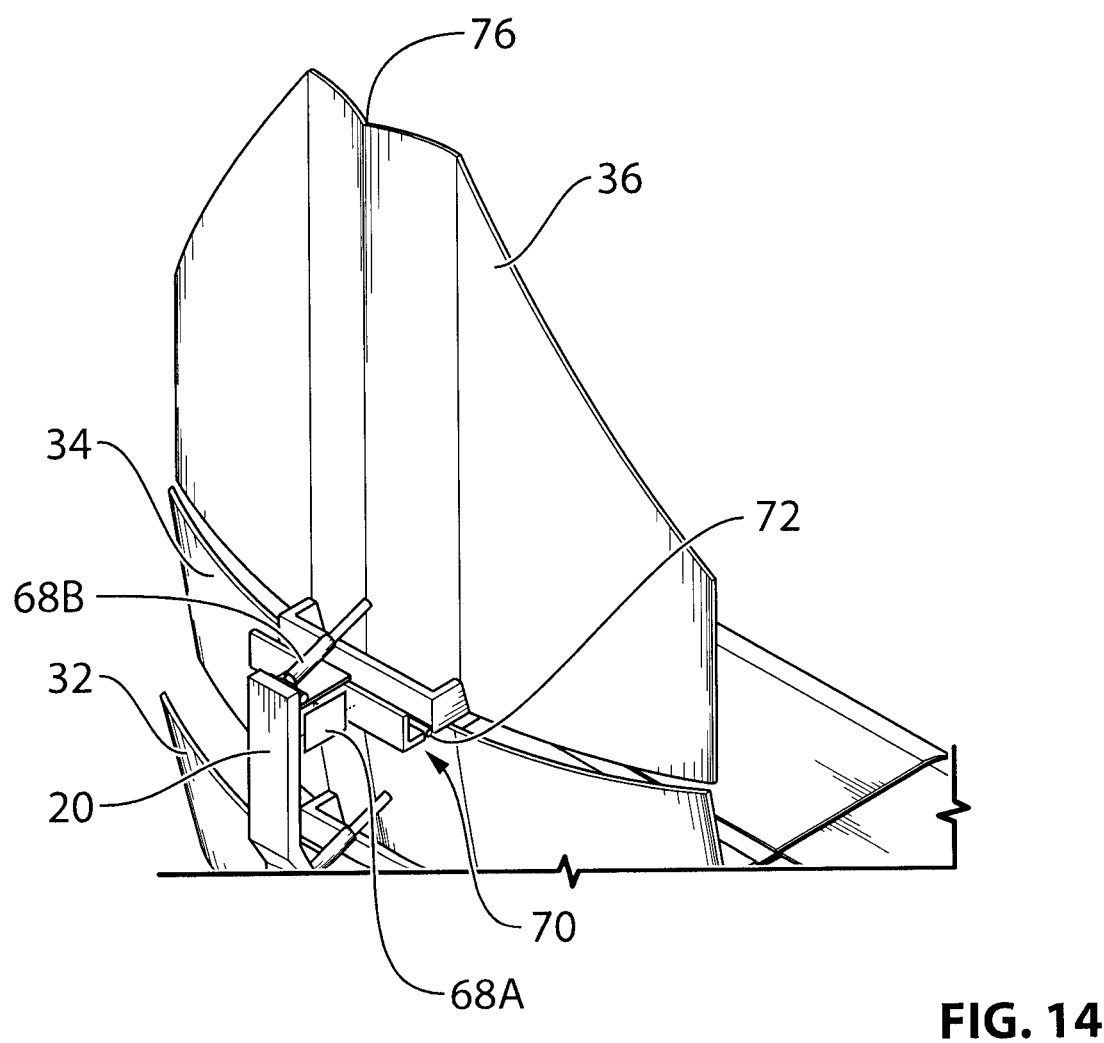
FIG. 14 is a perspective view of an exemplary thoracic panel of the structure of FIG. 2.

FIG. 14 shows a perspective view of thoracic panel 36 which may be part of back rest structure 24. Similar to gluteal panel 32, thoracic panel 36 may support part of the user and may be adjustable to accommodate different body types and sizes. In some embodiments, thoracic panel 36 may be adjustable in one or more degrees of freedom. For example, thoracic panel 36 may be adjustable by translation and/or rotation. For example, thoracic panel 36 may be translatable toward and away from frame 20 via first actuator 68A. Thoracic panel 36 may also be rotatable (i.e., tiltable) relative to frame 20 via second actuator 68B. For example, thoracic panel 36 may be movably connected to frame 20 via first actuator 68A and bracket 70. Bracket 70 may comprise hinge 72 that may permit rotation of thoracic panel 36 by the actuation of actuator 68B. Second actuator 68B may be connected to thoracic panel 36 and bracket 70 in order to cause rotation of thoracic panel 36 about hinge 72. Alternatively, second actuator 68B could be connected directly to frame 20 in some embodiments. In some embodiments, thoracic panel 36 may have a range of motion including about 15 degrees of angular adjustment and about 4 inches (10 cm) of horizontal adjustment.

Actuators 68A, 68B may be of any suitable type. For example, actuators 68A, 68B may be of the mechanical, hydraulic, electric and/or pneumatic type. In some embodiments, one or more of actuators 68A, 68B may comprise a scissor mechanism. In some embodiments, actuators 68A, 68B may be actuated from a power source other than the user and/or be manually actuated by the user. In some embodiments, one or more of actuators 68A, 68B may provide a passive resistance that may permit movement of thorasic panel 36 upon the application of an amount of force that may be predetermined. In some embodiments, actuators

68A, 68B may be configured so that such predetermined amount of force may be adjustable.

Figure 15A:
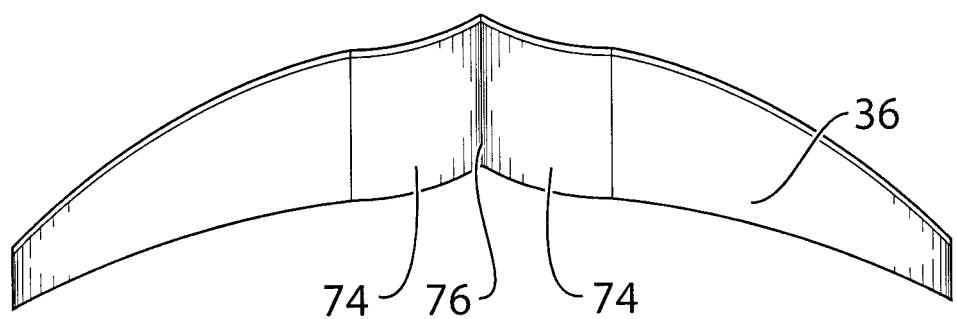
FIGS. 15A and 15B are perspective views of the thoracic panel of FIG. 14 from different viewpoints.
Figure 15B:
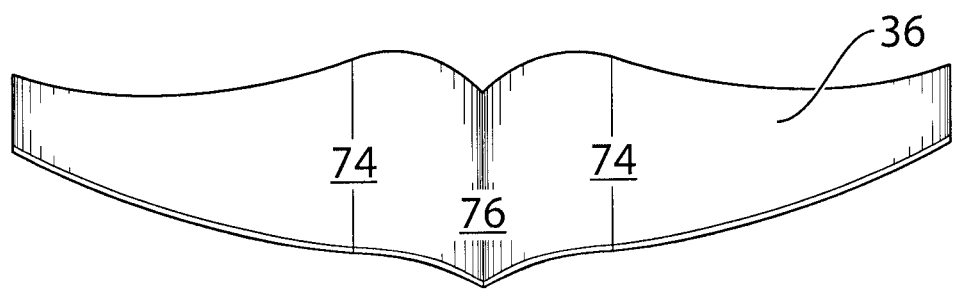

FIGS. 15A and 15B are perspective views of thoracic panel 36 from different viewpoints. Thoracic panel 36 may comprises one or more loading zones 74 for applying pressure on and/or supporting the user. For example, thoracic panel 36 may comprise two loading zones 74 separated by spine relief zone 76. Loading zones 74 may comprise surface areas of thoracic panel 36 that are used to apply pressure on part of the user so as to provide support for the user. For example, loading zones 74 of thoracic panel 36 may be adjacent spine relief zone 76 of thoracic panel 36. Spine relief zone 76 of thoracic panel 36 may comprise a recess formed into thoracic panel 36 so as to reduce or substantially eliminate pressure from being transmitted from thoracic panel 36 directly to the spine of the user. Spine relief zone 76 may extend across some or all of the height (i.e., along the spine of the user) of thoracic panel 36 and loading zones 74 may correspondingly comprise surface areas adjacent spine relief zone 76 extending across some or all of the height of thoracic panel 36. As shown in FIGS. 15A and 15B, thoracic panel 36 may have an overall concave shape facing the user for accommodating part of the user.

Figure 16:
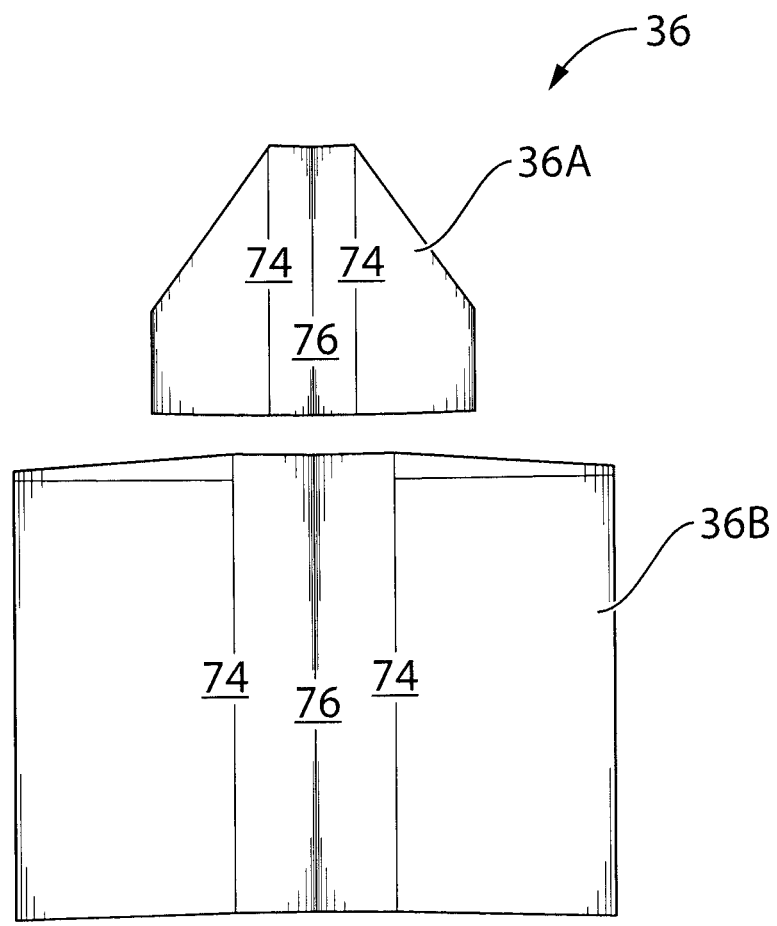
FIG. 16 is a front view of another exemplary thoracic panel of the structure of FIG. 2.

FIG. 16 is a front view of another exemplary thoracic panel 36 of back rest structure 24. As described above, thoracic panel 36 may have a unitary construction. Alternatively, thoracic panel 36 may comprise two or more parts. For example, thoracic panel 36 may comprise headrest 36A and main portion 36B. In some embodiments, headrest 36A and main portion 36B may be directly or indirectly connected together. In some embodiments, headrest 36A and main portion 36B may be separately connected to frame 20. Headrest 36A and main portion 36B may generally have the same or a similar profile as shown in FIGS. 15A and 15B and may each comprise spine relief zone 76 and loading zones 74. Alternatively, in some embodiments, headrest 36A may not comprise spine relief zone 76.

During operation, structure 18 of seating system 10 may be used to promote the adoption of a non-destructive seating posture by the user. For example, structure 18 may be used to transfer loads to parts of the body of the user that are more suitable for supporting such loads. For example, pressure applied on the ischial tuberosity and sacral area of the user that is typical when using conventional seating systems may be reduced by redistributing loads on other parts of the body. In some embodiments, structure 18 may promote the adoption of a desirable orientation of the pelvis during sitting. In some embodiments, the seating posture promoted by structure 18 may provide a foundation for supporting the weight of the torso of the user.

Figure 17A:
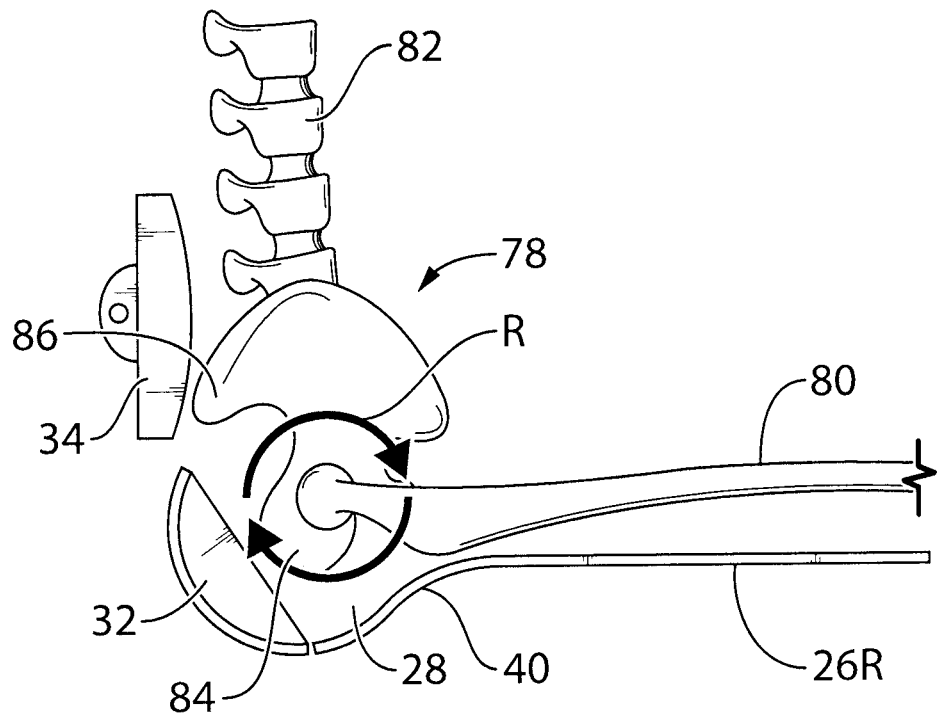
FIGS. 17A and 17B are side views of a right thigh panel, a corresponding right side of a gluteal panel, a corresponding right side of a PSIS panel of the structure of FIG. 2 and part of a skeleton of a user.
Figure 17B:
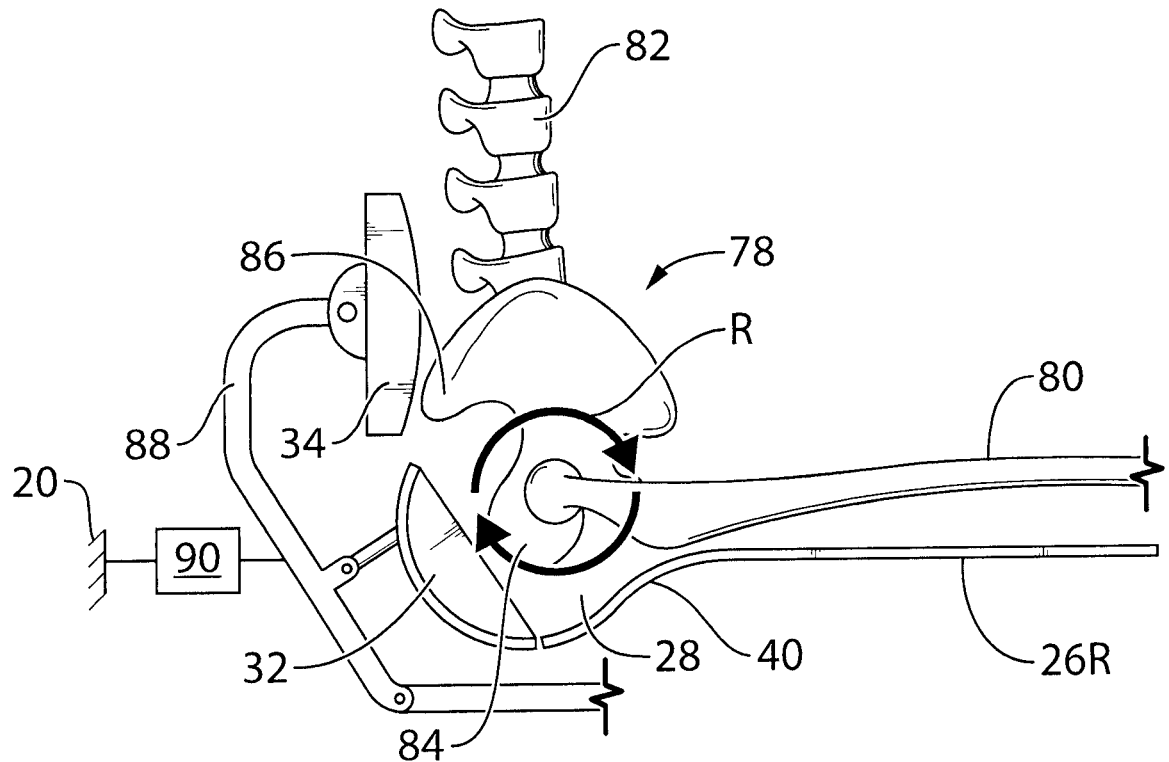

FIGS. 17A and 17B show side views of right thigh panel 26R, a corresponding right hand side of gluteal panel 32, a corresponding right hand side of PSIS panel 34 and part of a skeleton of a user. FIGS. 17A and 17B show different embodiments of gluteal panel 32 and PSIS panel 34. The partial skeleton shown includes pelvis 78, femur 80 and spine 82.

The human pelvis 78 is well constructed for containing internal organs, creating a base for spine 82 and creating a joint socket for femur 80. However, it is not particularly constructed for weight bearing while seated. Sharp bones called ischial tuberosity 84 on the bottom of pelvis 78 create a problem because they do not provide good load bearing properties as the feet or other parts of the body do. When sitting on conventional chairs, much of our weight is concentrated on ischial tuberosity 84 (i.e., the two sharp bones) and this causes a stress on the tissue under ischial tuberosity 84. This stress in turn causes discomfort that we typically address by shifting our weight frequently off of ischial tuberosity 84 and/or immersing ischial tuberosity 84 in a medium such as foam to distribute the pressure over a larger surface area. In cases where people are unable to reposition themselves, the reduced blood flow to the affected areas combined with other factors such as heat and moisture, can cause the skin to become compromised (e.g., cause pressure ulcers). The discomfort that we experience in this case can cause us to frequently alter the posture in which we sit. Often that posture is not conducive to providing an efficient system to handle the pressures of supporting our body weight. We become unstable in our posture and in search for stability we slouch and lean into postures that can lead to back pain, neck pain and a host of other issues.

Some aspects of seating system 10 are designed taking into consideration some of these limitations of the human anatomy to provide improved comfort by re-distributing pressure and promoting a posture that is more conducive to sitting.

As described above, pelvic well 28 may receive ischial tuberosity 84 of the user therein. PSIS panel 34 may be disposed above gluteal panel 32. PSIS panel 34 may be adjustable to cause movement of PSIS 86 of the user and cooperate with pelvic well 28 to cause rotation of pelvis 78 of the user about the fulcrum provided by pelvic well 28. In some embodiments, transitional wall 40 may function as a ridge substantially preventing forward movement of ischial tuberosity 84 when PSIS panel 34 is actuated to push PSIS 86 forward. Accordingly, the prevention of forward movement of ischial tuberosity 84 during such pressure being applied by PSIS panel 34 may cause well 28 (e.g., transition wall 40) to function as a fulcrum about which rotation of pelvis 78 may occur as indicated by arrows R. Such rotation and support provided by PSIS panel 34 may prevent or hinder posterior pelvic tilt.

Gluteal panel 32 may also contribute toward preventing or hindering posterior pelvic tilt by applying a desired pressure on the gluteal mass of the user. Accordingly, gluteal panel 32 may be used in conjunction with PSIS panel 34 for preventing or hindering posterior pelvic tilt. Alternatively, gluteal panel 32 may be used instead of PSIS panel 34 for preventing or hindering posterior pelvic tilt. Gluteal panel 32 may provide a surface of contact that may serve to prevent or hinder pelvis 78 from rotating posteriorly.

The adjustment of PSIS panel 34 may also be used to promote proper spine alignment of the user during sitting. In some cases, proper spine alignment may be a contributing factor in preventing back pain. Adopting a neutral posture may also promote respiratory efficiency that may consequently reduce drowsiness and improve performance while at a task.

The use of pelvic well 28, gluteal panel 32 and/or PSIS panel 34 may cause some of the load associated with the weight of the user to be transferred to the thighs of the user instead of the ischial tuberosity 84. The thighs may be better suited to withstand such load and may also increase stability because of the relatively large surface area that they provide. In comparison with conventional seating systems, the use of structure 18 may, in some embodiments, cause the pressure normally applied to the ischial tuberosity 84 to be reduced. In some embodiments, the use of structure 18 may also promote neutral stacking of some of the vertebras of the user The use of structure 18 may promote a neutral orientation of pelvis 78. The support of pelvis 78 provided by structure to maintain such neutral orientation may also hinder the posture of the user from deteriorating when sitting for long periods. For example, the combination of pelvic well 28 and one or both of gluteal panel 32 and PSIS panel 34 may, in some embodiments, provide substantially secure support for pelvis 78 so as to maintain a secure base for supporting spine 82 and the weight of the torso and head of the user.

In some embodiments, thoracic panel 36 may provide further support for the user. In some embodiments, adjustment of thoracic panel 36 may also provide another mechanism for controlling/adjusting the posture of the user.

In the embodiment shown in FIG. 17A, gluteal panel 32 and PSIS panel 34 may be independently actuatable as explained above and as illustrated in FIG. 2. However, in other embodiments, one or more panels of structure 18 may be actuated together via a common actuator and/or actuation mechanism. For example, as shown in FIG. 17B, gluteal panel 32 and PSIS panel 34 may be interconnected via interconnecting arm 88 so as to be actuated via common actuator 90 that may be operationally interposed between interconnecting arm 88 and frame 20. In various embodiments, gluteal panel 32 and/or PSIS panel 34 may be pivotally connected or rigidly connected to interconnecting arm 88.

Figure 18:
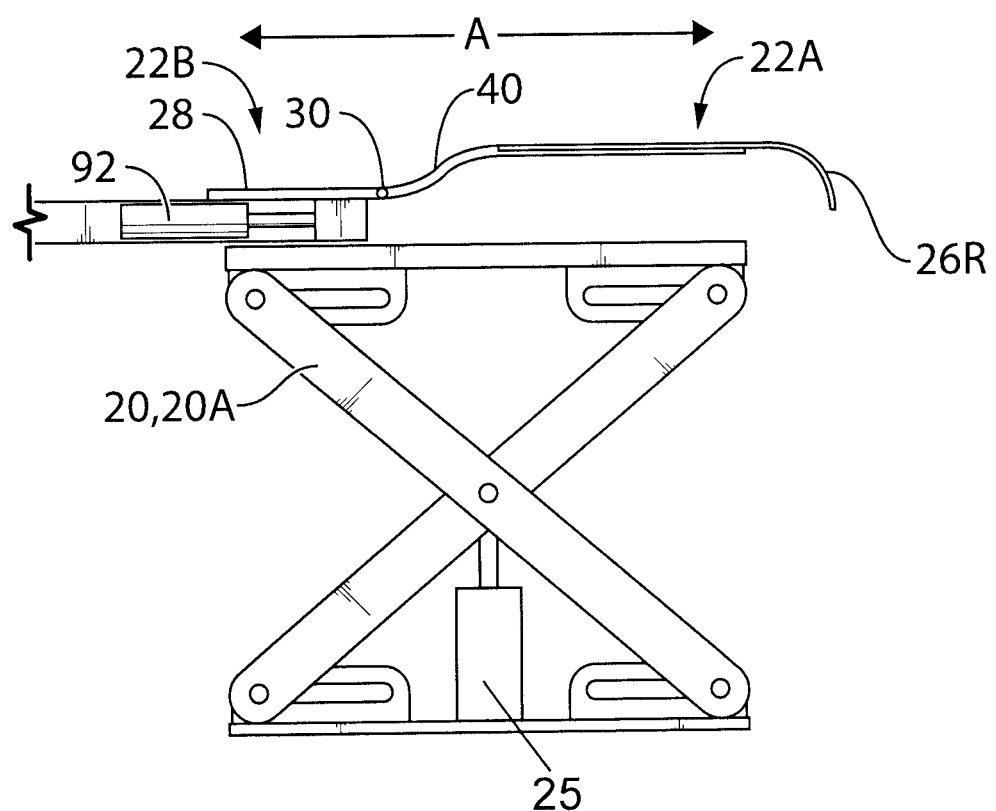
FIG. 18 is a side view of the seat structure of the structure of FIG. 2 showing an actuator for causing movement of the seat structure along a horizontal direction.

FIG. 18 is a side view of seat structure 22 of structure 18 showing actuator 92 configured for causing translation movement of at least part of seat structure 22 along the horizontal direction (see line H in FIG. 2) shown by arrow A. Actuator 92 may be incorporated in any of the embodiments of structure 18 or parts thereof described and/or shown herein. In some embodiments, actuator 92 may be configured to cause forward and/or backward movement of thigh support region 22A and/or pelvic support region 22B relative to frame 20.

In some embodiments, such adjustment of seat structure 22 may be used in conjunction with adjustment of gluteal panel 32, PSIS panel 34 and/or thoracic panel 36 to accommodate different sizes/shapes of users, improve the comfort of the user and/or adjust the posture of the user. For example, the amount of travel (i.e., adjustment) of at least part of seat structure 22 via actuator 92 may require less travel (i.e., adjustment) from other panels (e.g., 32, 34, 36) of structure 18 to provide the same or similar accommodation to the user than would otherwise be required by the other panels (e.g., 32, 34, 36) in the absence of actuator 92. For example, as described above, gluteal panel 32 may be configured to be adjustable by about 4 inches (10 cm) in the horizontal direction in some embodiments not comprising actuator 92. However, with actuator 92 permitting adjustment of seat structure 22 by about 2 inches (5 cm) in the horizontal direction, gluteal panel 32 could then be configured to be adjustable by only 2 inches (5 cm) instead of 4 inches (10 cm) in the horizontal direction to provide the same or similar accommodation for the user. It should be understood that the exemplary dimensions provided herein are for illustrative purposes only and are not intended to be limiting.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the systems, devices and assemblies disclosed and shown herein may comprise a specific number of elements/components, the systems, devices and assemblies could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples disclosed herein, but should be given the broadest interpretation consistent with the description as a whole.

What is claimed is:

1. A structure of a seating system for a human user, the structure comprising:
   a frame;
   a seat structure supported by the frame, the seat structure comprising a thigh support region and a pelvic support region, the pelvic support region defining a pelvic well for receiving an ischial tuberosity of the user and providing a fulcrum for rotation of a pelvis of the user;
   a back rest structure supported by the frame, the back rest structure comprising:
      a gluteal panel for supporting a gluteal mass of the user; and
      a posterior superior iliac spine (PSIS) panel disposed above the gluteal panel, the PSIS panel being adjustable to cause movement of a PSIS of the user and cooperate with the pelvic well to cause rotation of the pelvis of the user about the fulcrum provided by the pelvic well, wherein:
   the PSIS panel comprises two loading zones separated by a spine relief zone; and
   the spine relief zone of the PSIS panel comprises a recess formed into the PSIS panel.

2. The structure as defined in claim 1, wherein the PSIS panel is adjustable by translation.

3. The structure as defined in claim 1, wherein the PSIS panel is adjustable by rotation.

4. The structure as defined in claim 1, wherein the two loading zones of the PSIS panel are adjacent the spine relief zone of the PSIS panel.

5. The structure as defined in claim 1, wherein the PSIS panel has an overall concave shape facing the user.

6. The structure as defined in claim 1, wherein the gluteal panel is adjustable by translation.

7. The structure as defined in claim 1, wherein the gluteal panel is adjustable by rotation.

8. The structure as defined in claim 1, wherein the gluteal panel comprises two loading zones separated by a spine relief zone.

9. The structure as defined in claim 8, wherein the two loading zones of the gluteal panel are adjacent the spine relief zone of the gluteal panel.

10. The structure as defined in claim 8, wherein the spine relief zone of the gluteal panel comprises a recess formed into the gluteal panel.

11. The structure as defined in claim 1, wherein the gluteal panel has an overall concave shape facing the user.

12. The structure as defined in claim 1, wherein the gluteal panel has a coccyx relief zone.

13. The structure as defined in claim 12, wherein the coccyx relief zone comprises a coccyx aperture in the gluteal panel.

14. The structure as defined in claim 1, wherein the seat structure comprises a perineal relief zone.

15. The structure as defined in claim 14, wherein the perineal relief zone comprises a perineal aperture in the seat structure.

16. The structure as defined in claim 1, wherein the thigh support region comprises a left thigh panel and a right thigh panel, the left thigh panel and the right thigh panel being independently adjustable.

17. The structure as defined in claim 16, wherein each of the left thigh panel and the right thigh panel is rotatable relative to the pelvic support region.

18. The structure as defined in claim 16, wherein each of the left thigh panel and the right thigh panel is hingedly connected to the pelvic support region.

19. The structure as defined in claim 16, wherein a length of each of the left thigh panel and the right thigh panel is adjustable to accommodate a range of femur lengths.

20. The structure as defined in claim 1, wherein the pelvic well has a depth of about 3.8 cm (1.5 inch) relative to the thigh support region.

21. The structure as defined in claim 1, wherein the back rest structure comprises a thoracic panel disposed above the PSIS panel.

22. The structure as defined in claim 21, wherein the thoracic panel is adjustable by translation.

23. The structure as defined in claim 21, wherein the thoracic panel is adjustable by rotation.

24. The structure as defined in claim 21, wherein the thoracic panel provides two loading zones separated by a spine relief zone.

25. The structure as defined in claim 24, wherein the two loading zones of the thoracic panel are adjacent the spine relief zone of the thoracic panel.

26. The structure as defined in claim 24, wherein the spine relief zone of the thoracic panel comprises a recess formed into the thoracic panel.

27. The structure as defined in claim 21, wherein the thoracic panel has an overall concave shape facing the user.

28. A seating system comprising the structure as defined in claim 1.

29. A vehicle seat comprising the structure as defined in claim 1.

30. A structure of a seating system for a human user, the structure comprising:
   a frame;
   a seat structure supported by the frame, the seat structure comprising a thigh support region and a pelvic support region, the pelvic support region defining a pelvic well for receiving an ischial tuberosity of the user and providing a fulcrum for rotation of a pelvis of the user;
   a back rest structure supported by the frame, the back rest structure comprising:
      a gluteal panel for supporting a gluteal mass of the user; and
      a posterior superior iliac spine (PSIS) panel disposed above the gluteal panel, the PSIS panel being adjustable to cause movement of a PSIS of the user and cooperate with the pelvic well to cause rotation of the pelvis of the user about the fulcrum provided by the pelvic well,
   wherein:
      the gluteal panel comprises two loading zones separated by a spine relief zone; and
      the spine relief zone of the gluteal panel comprises a recess formed into the gluteal panel.

31. A structure of a seating system for a human user, the structure comprising:
   a frame;
   a seat structure supported by the frame, the seat structure comprising a thigh support region and a pelvic support region, the pelvic support region defining a pelvic well for receiving an ischial tuberosity of the user and providing a fulcrum for rotation of a pelvis of the user;
   a back rest structure supported by the frame, the back rest structure comprising:
      a gluteal panel for supporting a gluteal mass of the user; and
      a posterior superior iliac spine (PSIS) panel disposed above the gluteal panel, the PSIS panel being adjustable to cause movement of a PSIS of the user and cooperate with the pelvic well to cause rotation of the pelvis of the user about the fulcrum provided by the pelvic well,
   wherein:
      the gluteal panel has a coccyx relief zone; and
      the coccyx relief zone comprises a coccyx aperture in the gluteal panel.

32. A structure of a seating system for a human user, the structure comprising:
   a frame;
   a seat structure supported by the frame, the seat structure comprising a thigh support region and a pelvic support region, the pelvic support region defining a pelvic well for receiving an ischial tuberosity of the user and providing a fulcrum for rotation of a pelvis of the user;
   a back rest structure supported by the frame, the back rest structure comprising:
      a gluteal panel for supporting a gluteal mass of the user; and
      a posterior superior iliac spine (PSIS) panel disposed above the gluteal panel, the PSIS panel being adjustable to cause movement of a PSIS of the user and cooperate with the pelvic well to cause rotation of the pelvis of the user about the fulcrum provided by the pelvic well,
   wherein:
      the seat structure comprises a perineal relief zone; and
      the perineal relief zone comprises a perineal aperture in the seat structure.

33. A structure of a seating system for a human user, the structure comprising:
   a frame;
   a seat structure supported by the frame, the seat structure comprising a thigh support region and a pelvic support region, the pelvic support region defining a pelvic well for receiving an ischial tuberosity of the user and providing a fulcrum for rotation of a pelvis of the user;
   a back rest structure supported by the frame, the back rest structure comprising:
      a gluteal panel for supporting a gluteal mass of the user; and
      a posterior superior iliac spine (PSIS) panel disposed above the gluteal panel, the PSIS panel being adjustable to cause movement of a PSIS of the user and cooperate with the pelvic well to cause rotation of the pelvis of the user about the fulcrum provided by the pelvic well,
   wherein:
      the back rest structure comprises a thoracic panel disposed above the PSIS panel;
      the thoracic panel provides two loading zones separated by a spine relief zone; and
      the spine relief zone of the thoracic panel comprises a recess formed into the thoracic panel.

* * * * *